(12) United States Patent
Haino et al.

(10) Patent No.: US 7,440,678 B2
(45) Date of Patent: Oct. 21, 2008

(54) INFORMATION RECORDING APPARATUS AND METHOD FOR RECORDING INFORMATION ONTO A REWRITABLE-TYPE RECORDING MEDIUM

(75) Inventors: Nobuo Haino, Saitama-ken (JP); Kazutaka Mitsuiki, Saitama-ken (JP)

(73) Assignees: Pioneer Corporation, Tokyo (JP); Sony Corporation, Tokyo (JP)

( * ) Notice: Subject to any disclaimer, the term of this patent is extended or adjusted under 35 U.S.C. 154(b) by 881 days.

(21) Appl. No.: 10/447,265

(22) Filed: May 29, 2003

(65) Prior Publication Data

US 2004/0033054 A1 Feb. 19, 2004

(30) Foreign Application Priority Data

May 29, 2002 (JP) ............................. 2002-156452

(51) Int. Cl.
H04N 5/91 (2006.01)
(52) U.S. Cl. ..................... 386/95; 386/125; 386/126
(58) Field of Classification Search ................ 386/95, 386/125–126
See application file for complete search history.

(56) References Cited

U.S. PATENT DOCUMENTS

2003/0210627 A1* 11/2003 Ijtsma et al. ............ 369/53.18

FOREIGN PATENT DOCUMENTS

| JP | 9-115246 A | 5/1997 |
|---|---|---|
| JP | 2001-110055 A | 4/2001 |
| JP | 2001-291367 A | 10/2001 |
| JP | 2002-063765 A | 2/2002 |

* cited by examiner

*Primary Examiner*—Marsha D. Banks-Harold
*Assistant Examiner*—Daniel Tekle
(74) *Attorney, Agent, or Firm*—Sughrue Mion, PLLC

(57) ABSTRACT

The information recording apparatus records unit information which includes recording information including, for example, video and audio data and reproduction control information for the reproduction on a rewritable-type recording medium. After information is recorded, temporary management information for all the unit recording information recorded on the recording medium is produced and is recorded on the recording medium. By producing temporary management information and recording it on the recording medium every time new unit recording information is recorded on the recording medium, it becomes possible to reproduce the respective unit recording information from the recording medium by referring to the temporary management information. If an access error such as a writing error or a verify error occurs at the time of recording the temporary management information at the temporary recording position, that position is not used anymore and the temporary recording position of the temporary management information is changed or shifted.

15 Claims, 11 Drawing Sheets

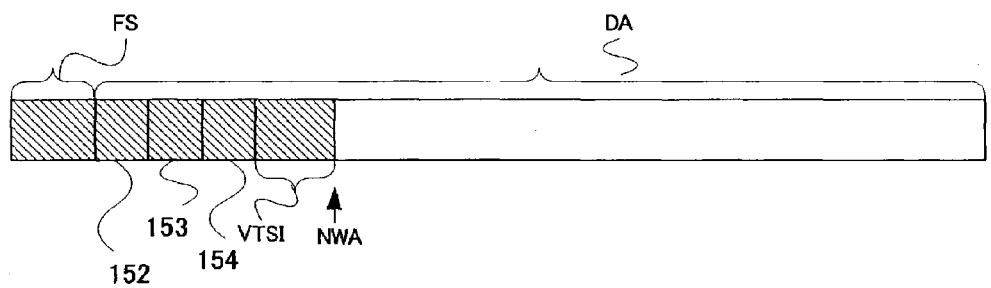
FIG. 6A
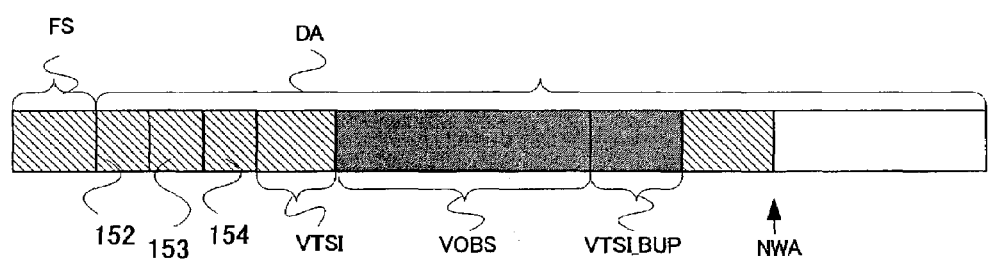
FIG. 6B
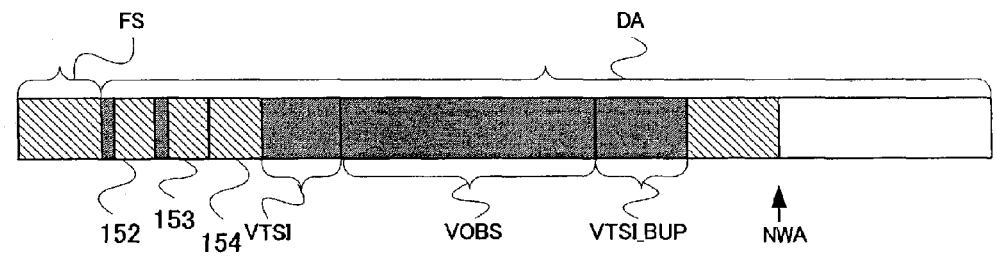
FIG. 6C
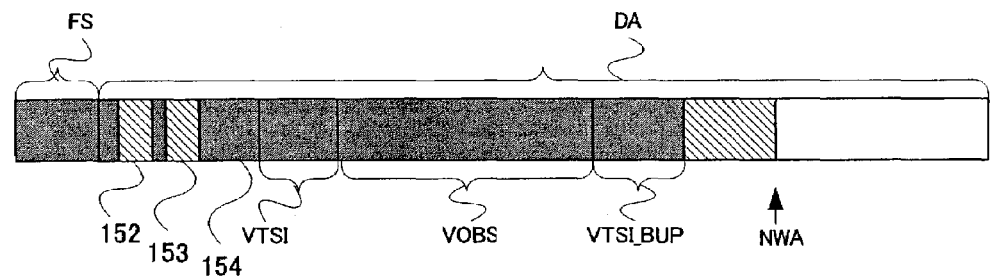
FIG. 6D
 RECORDED      NULL DATA

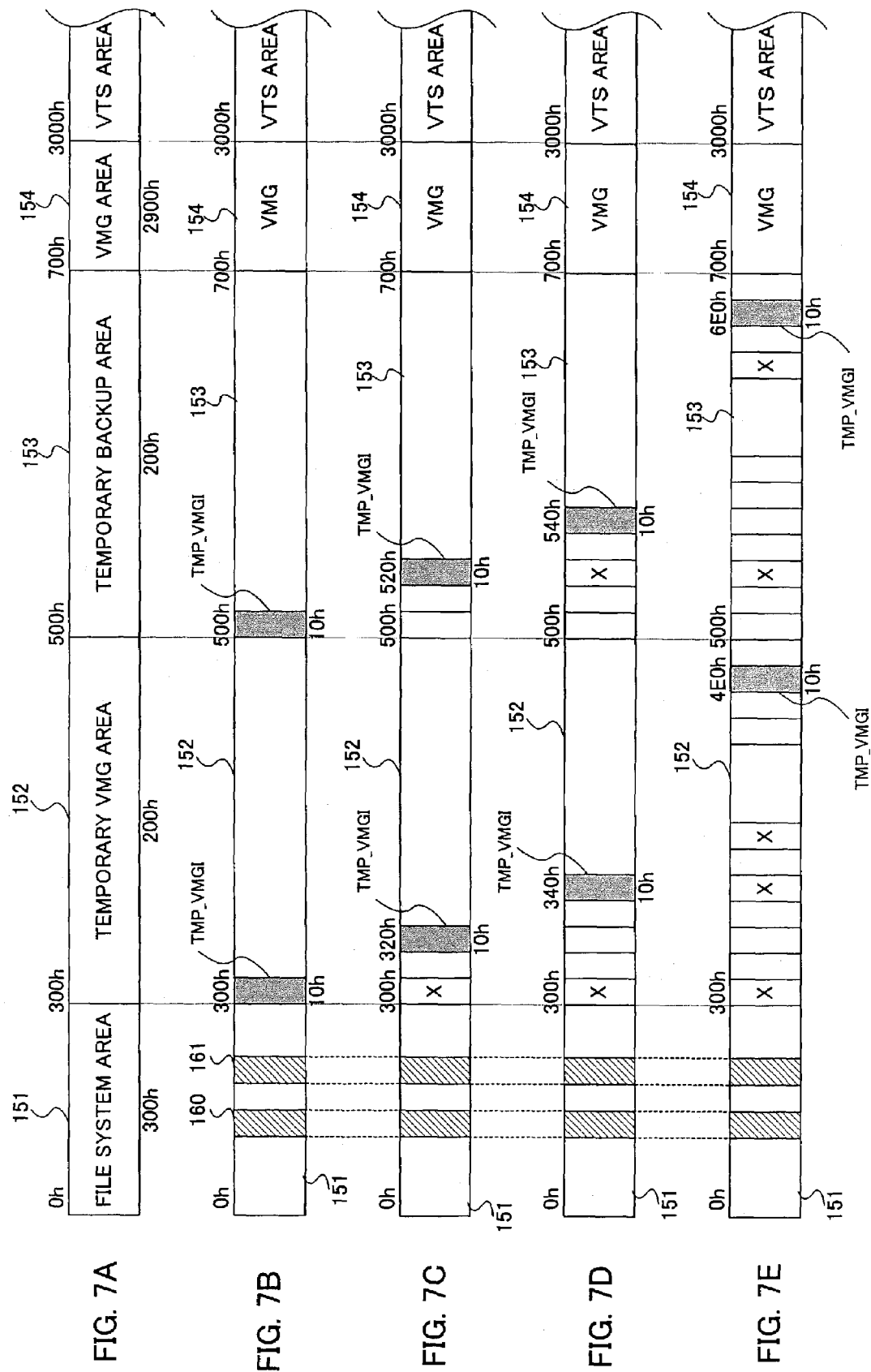

INFORMATION RECORDING APPARATUS AND METHOD FOR RECORDING INFORMATION ONTO A REWRITABLE-TYPE RECORDING MEDIUM

BACKGROUND OF THE INVENTION

1. Field of the Invention

The present invention relates to an information recording apparatus and an information recording method which are suitable for recording information onto a rewritable-type recording medium such as a DVD-RW (DVD-Rewritable).

2. Description of Related Art

In the field of optical disc, there is a tendency that the recording density is increasing. A DVD is an optical disc that meets such a need of increase in the recording density. By compressing image data by the image processing technique called MPEG2, image and voice data corresponding to a movie can be recorded on a single DVD disc. Nowadays, a DVD for reproduction only in which a movie is recorded is put on sale. In that DVD for reproduction only, video data and audio data are recorded in accordance with a recording format called "DVD-video". Therefore, by reproducing the DVD for reproduction only by a DVD player in conformity with the DVD-video format, the user can enjoy the contents such as a movie.

Recently, a rewritable-type DVD such as a DVD-RW is broadly used. On the DVD-RW, information can be rewritten for about a thousand times. The user can use the DVD-RW instead of a conventional VTR and record video and audio data of the television broadcasting programs or the like onto a rewritable-type DVD such as the DVD-RW.

When recording the television broadcasting program on the DVD-RW on the real-time basis in accordance with the DVD-video format, the video data and audio data as well as the recording control information, constituting the program, are sequentially recorded, on the real-time basis, onto the recording area of the DVD-RW. The management information associated with the video data and the audio data is temporarily recorded onto a predetermined area of the DVD-RW.

Specifically, when recording a television broadcasting program on the DVD-RW by a DVD recorder, the video data and audio data constituting the program are recorded on the DVD-RW as one or a plurality of VOBs on the real-timebasis. When the recording of that program is ended by the user's instruction, a VTSI which is the reproduction control information necessary to reproduce the recorded VOBs is recorded. Thus, the program is recorded on the DVD-RW disc as a single title including one or a plurality of VOBs, the VTSI, and backup information of the VTSI.

However, until the user finalizes the DVD-RW, VMGI (Video Manager Information) which is the management information of the recorded video data and audio data is not recorded on the DVD-RW. For this reason, until the DVD-RW is finalized by the instruction made by the user, temporary VMGI that temporarily manages the information associated with the title recorded on the DVD-RW is recorded on a predetermined area of the DVD-RW. The temporary VMGI includes the number of the VTSs recorded on the disc at that time, information on the disc name, physical locations of the VTSs for a predetermined number of the titles, title names and so on.

Until the user finalizes the DVD-RW, the contents of the temporary VMGI are changed and repeatedly recorded on the predetermined area every time a new title is recorded. When the user finalizes the DVD-RW, the temporary VMGI is recorded on a predetermined position as the VMGI. Thus, the finalized DVD-RW becomes in conformity with the above-mentioned DVD-video format like the DVD for reproduction only, and the recorded titles can be reproduced by a DVD player for reproduction only.

However, repeated recording of the temporary VMGI onto a predetermined area on the DVD-RW may cause the read-out errors as the recording frequency increases. While the DVD-RW is basically produced to be resistant to the data rewriting for about thousand times, if the user repeatedly records the TV broadcasting programs on the DVD-RW like the manner of using the conventional VTR, the temporary VMGI is rewritten quite frequently. As a result, the recording surface may be deteriorated and the possibility of the read-out errors increases. When the read-out error of the temporary VMGI occurs, the management information indicating, for example, the titles recorded in that DVD-RW cannot be obtained, thereby causing a trouble in reproduction.

SUMMARY OF THE INVENTION

The present invention has been made in view of the above-described problems, and its object is to enable the stable recording and reproduction of the management information associated with the recorded information when information is repeatedly recorded on a rewritable optical disc such as a DVD-RW.

According to one aspect of the present invention, there is provided an information recording apparatus which records information on a rewritable-type recording medium in accordance with a predetermined recording format, including: a recording device which records unit recording information including recording information and reproduction control information for controlling reproduction of the recording information on the rewritable-type recording medium; a temporary management information producing device which produces temporary management information for temporarily managing all the unit recording information recorded on the rewritable-type recording medium; and a temporary management information recording device which records the temporary management information at a temporary recording position on the rewritable-type recording medium, wherein the temporary management information recording device changes the temporary recording position and records the temporary management information at the temporary recording position after change when an access error of the temporary management information occurs.

According to the above information recording apparatus, the unit information including the recording information such as video data and audio data and the reproduction control information for reproducing the recording information are recorded on the rewritable-type recording medium. Further, the temporary management information for all the unit recording information recorded on the recording medium is produced and recorded on the recording medium. The temporary management information is management information that temporarily manages the unit information recorded on the recording medium. Therefore, by producing the temporary management information and recording it on the recording medium each time new unit recording information is recorded on the recording medium, it becomes possible to reproduce the respective unit recording information from the recording medium by referring to the temporary management information.

When an access error such as a writing error or a verify error occurs, for example, at the time of recording the temporary management information, the position of the recording medium at which the error occurred is not used for recording the temporary management information any more. Namely, the temporary recording position is changed and the temporary management information is recorded on the position thus changed. Since the temporary management information is recorded each time new unit information is recorded on the recording medium, there is the possibility that an access error will occur because the position of the recording medium may be partially deteriorated due to the repeated recording. However, in the present invention, since the temporary recording position for recording the temporary management information is changed in such a case, the temporary management information can always be recorded and reproduced correctly.

The temporary management information recording device may set the temporary recording position after change to a position which is not adjacent to the temporary recording position before change. When the access error occurs, it is possible in some cases that the physical deterioration or defect on the recording medium, causing the access error, is broad to some extent. By changing the temporary recording position to the position that is not adjacent to the position where the deterioration, defects, or the like have occurred, it is possible to record and retain the temporary management information more safely.

The temporary management information recording device may record the temporary management information as a block having a predetermined data amount and may set the temporary recording position after change to a position spaced by one block from the temporary recording position before change. In this feature, by managing the change of the temporary recording position in units of the recorded temporary management information, it becomes possible to simplify the processing for changing the temporary recording position.

The information recording apparatus may further include a temporary recording position information recording device which records temporary recording position information indicating the temporary recording position on the rewritable-type recording medium at a predetermined position on the rewritable-type recording medium. According to this feature, since the recorded position of the temporary management information can be immediately obtained by referring to the temporary recording position information, it is possible to easily and quickly obtain the temporary management information when performing additional recording or reproduction.

The temporary management information recording device may record same temporary management information at two different positions on the rewritable-type recording medium. Further, in such a case, the rewritable-type recording medium may have a first temporary management information recording area and a second temporary management information recording area, and may record the same temporary management information in each of the first temporary management information recording area and the second temporary management information recording area. By this, even if one temporary management information is unreadable for some reason, the other temporary management information can be read. This enhances the safety and reliability in reading the temporary management information.

The temporary management information recording device may set the temporary recording position after change to a position which is not adjacent to the temporary recording position before change, in the case that the temporary management information is recorded in both the first and the second temporary management information recording areas. Thus, the temporary recording position after change may be a position spaced by one block from the temporary recording position before change.

The information recording apparatus may further include a temporary recording position information recording device which records temporary recording position information indicating the temporary recording positions in the first and the second temporary management information recording areas on a predetermined position on the rewritable-type recording medium, in the case that the temporary management information is recorded in both the first and the second temporary management information recording areas. This enables easy and quick access to the temporary management information.

The temporary recording position information recording device may record same temporary recording position information at different predetermined positions on the rewritable-type recording medium, thereby enhancing the safety with respect to the possibility that the temporary recording position information becomes unreadable.

In a preferred embodiment, the predetermined recording format may be in conformity with a DVD-video standard, the rewritable-type recording medium may include a DVD-RW, the unit recording information may be a VTS (Video Title Set) according to the recording format, and the temporary management information may be TMP_VMGI (Video Manager Information) according to the recording format. In addition, the temporary recording position may be located between a file system information area and a data recording area according to the recording format.

According to another aspect of the present invention, there is provided an information recording and reproducing apparatus which records information on a rewritable-type recording medium in accordance with a predetermined recording format and reproduces the information recorded thereon, the apparatus including: a recording device which records unit recording information including recording information and reproduction control information for controlling reproduction of the recording information on the rewritable-type recording medium; a temporary management information producing device which produces temporary management information for temporarily managing all the unit recording information recorded on the rewritable-type recording medium; a temporary management information recording device which records the temporary management information at a temporary recording position in a temporary recording area defined on the rewritable-type recording medium, wherein the temporary management information recording device changes the temporary recording position and records the temporary management information at the temporary recording position after change when an access error of the temporary management information occurs; a temporary recording position information recording device which records temporary recording position information indicating the temporary recording position on the rewritable-type recording medium on a predetermined position on the rewritable-type recording medium; and a reproducing device which obtains the temporary recording position information and then obtains the temporary management information based on the temporary recording position information to reproduce the unit recording information.

By the above information recording and reproducing apparatus, when reproducing the information from the rewritable-type recording medium having the temporary management information recorded thereon, it is possible to obtain the temporary recording position from the temporary position information and then access that position to obtain the temporary management information to reproduce the unit recording information recorded on the rewritable-type recording medium.

The reproducing device may obtain the temporary management information by sequentially reading the recording information in the temporary recording area when the temporary recording position information cannot be obtained from the rewritable-type recording medium. Therefore, even if the temporary recording position information is unreadable for some reason, it becomes possible to obtain the temporary management information and reproduce the unit recording information recorded on the rewritable-type recording medium.

According to still another aspect of the present invention, there is provided an information recording method which records information on a rewritable-type recording medium in accordance with a predetermined recording format, the method including: a recording step which records unit recording information including recording information and reproduction control information for controlling reproduction of the recording information on the rewritable-type recording medium; a temporary management information producing step which produces temporary management information for temporarily managing all the unit recording information recorded on the rewritable-type recording medium; and a temporary management information recording step which records the temporary management information at a temporary recording position on the rewritable-type recording medium, wherein the temporary management information recording step changes the temporary recording position and records the temporary management information at the temporary recording position after change when an access error of the temporary management information occurs.

According to still another aspect of the present invention, there is provided a computer program executed by a computer included in an information recording apparatus which records information on a rewritable-type recording medium in accordance with a predetermined recording format, the program causing the computer to function as: a recording device which records unit recording information including recording information and reproduction control information for controlling reproduction of the recording information on the rewritable-type recording medium; a temporary management information producing device which produces temporary management information for temporarily managing all the unit recording information recorded on the rewritable-type recording medium; and a temporary management information recording device which records the temporary management information at a temporary recording position on the rewritable-type recording medium, wherein the temporary management information recording device changes the temporary recording position and records the temporary management information into the temporary recording position after change when an access error of the temporary management information occurs.

According to still another aspect of the present invention, there is provided a recording medium that stores a program executed by a computer included in an information recording apparatus for recording information on a rewritable-type recording medium in accordance with a predetermined recording format, the program causing the computer to function as: a recording device which records unit recording information including recording information and reproduction control information for controlling reproduction of the recording information on the rewritable-type recording medium; a temporary management information producing device which produces temporary management information for temporarily managing all the unit recording information recorded on the rewritable-type recording medium; and a temporary management information recording device which records the temporary management information at a temporary recording position on the rewritable-type recording medium, wherein the temporary management information recording device changes the temporary recording position and records the temporary management information into the temporary recording position after change when an access error of the temporary management information occurs.

By the above-described information recording method, the computer program or the recording medium, the temporary recording information can be recorded in the same way as the case of the above-described information recording apparatus.

According to still another aspect of the present invention, there is provided an information carrier medium carrying information by an information carrying structure constructed on a rewritable-type recording medium in accordance with a predetermined recording format, the medium including: a first carrying area which carries unit recording information including recording information and reproduction control information for controlling reproduction of the recording information; a second carrying area which carries temporary management information for temporarily managing all the unit recording information recorded on the rewritable-type recording medium; and a third carrying area which carries temporary recording position information indicating a position of the temporary management information in the second retention area.

According to the above information carrier medium, the temporary management information for the unit recording information recorded on the rewritable-type recording medium is recorded on the recording medium, and further the temporary recording position information indicating the recording position of that temporary management information is also recorded on the recording medium. Accordingly, an information recording apparatus or an information recording and reproducing apparatus can reproduce the unit recording information recorded on the rewritable-type recording medium by obtaining the temporary recording position from the temporary recording position information and then obtaining the temporary management information recorded at that position.

The second carrying area may carry one or a plurality of temporary management information, and the temporary recording position information may indicate the position of latest temporary management information. By this, an information recording apparatus or an information recording and reproducing apparatus can obtain latest temporary information based on the temporary recording information. Thus, it is possible to correctly reproduce all the unit recording information recorded on the rewritable-type recording medium at the time.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 6A, 6B, 6C, and 6D are diagrams illustrating the recording sequence according to a restricted overwrite mode;

FIGS. 7A, 7B, 7C, 7D and 7E are diagrams illustrating a method of recording a temporary VMGI;

DETAILED DESCRIPTION OF THE PREFERRED EMBODIMENTS

The preferred embodiments of the present invention will now be described below with reference to the attached drawings.

In the embodiment described below, the present invention is applied to an information recording apparatus which records information, such as video information, onto a DVD-RW serving as a rewritable-type recording medium in accordance with the DVD-video standard, which is a standard of recording format used to record information such as a movie on a DVD for reproduction only.

DVD-video Standard

First, the DVD-video standard serving as a recording format, which the information recording apparatus of this embodiment should accord with, will be described by referring to FIGS. 1 to 4.

Figure 1:
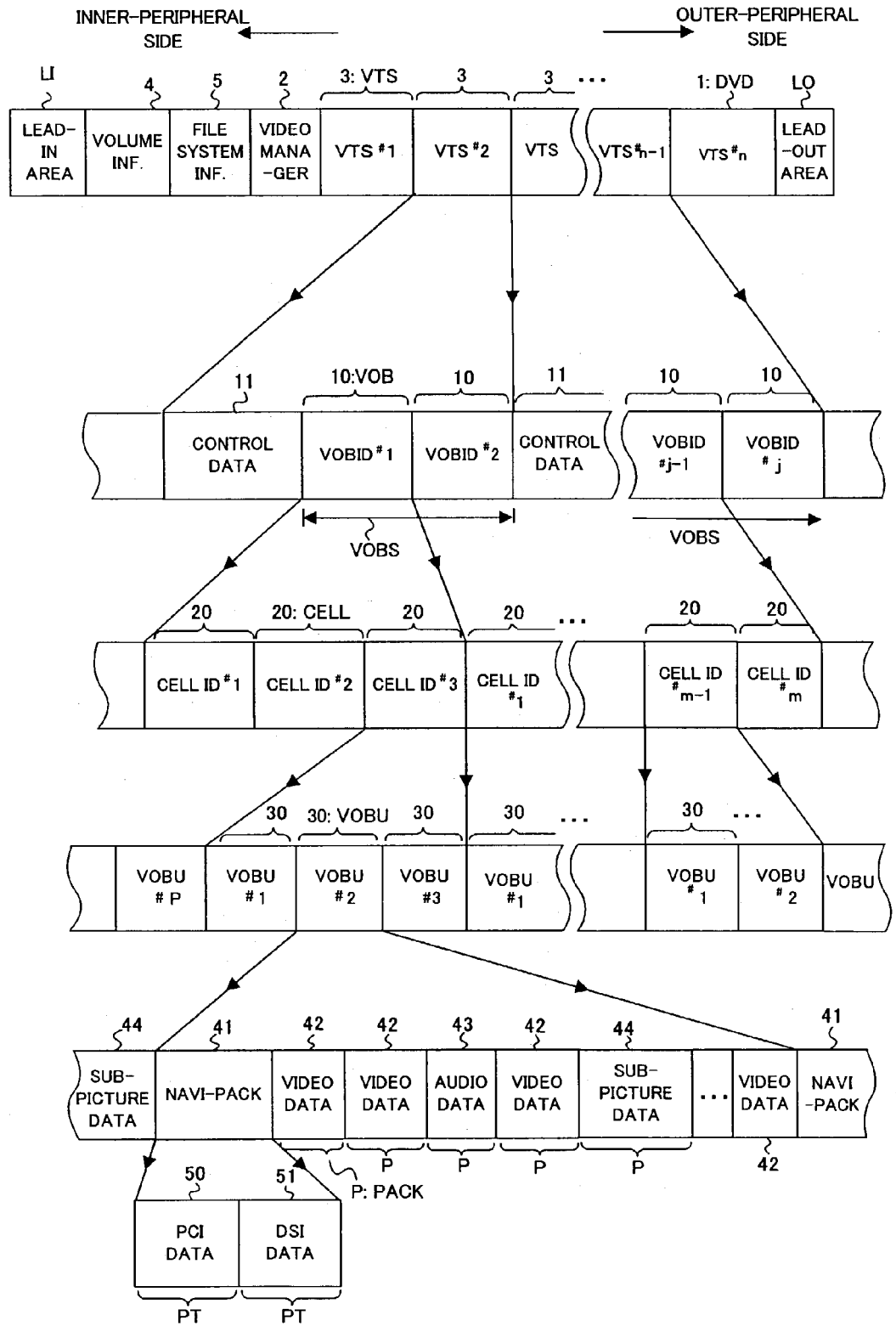
FIG. 1 is a diagram illustrating a physical recording format according to a DVD-video standard.
Figure 2:
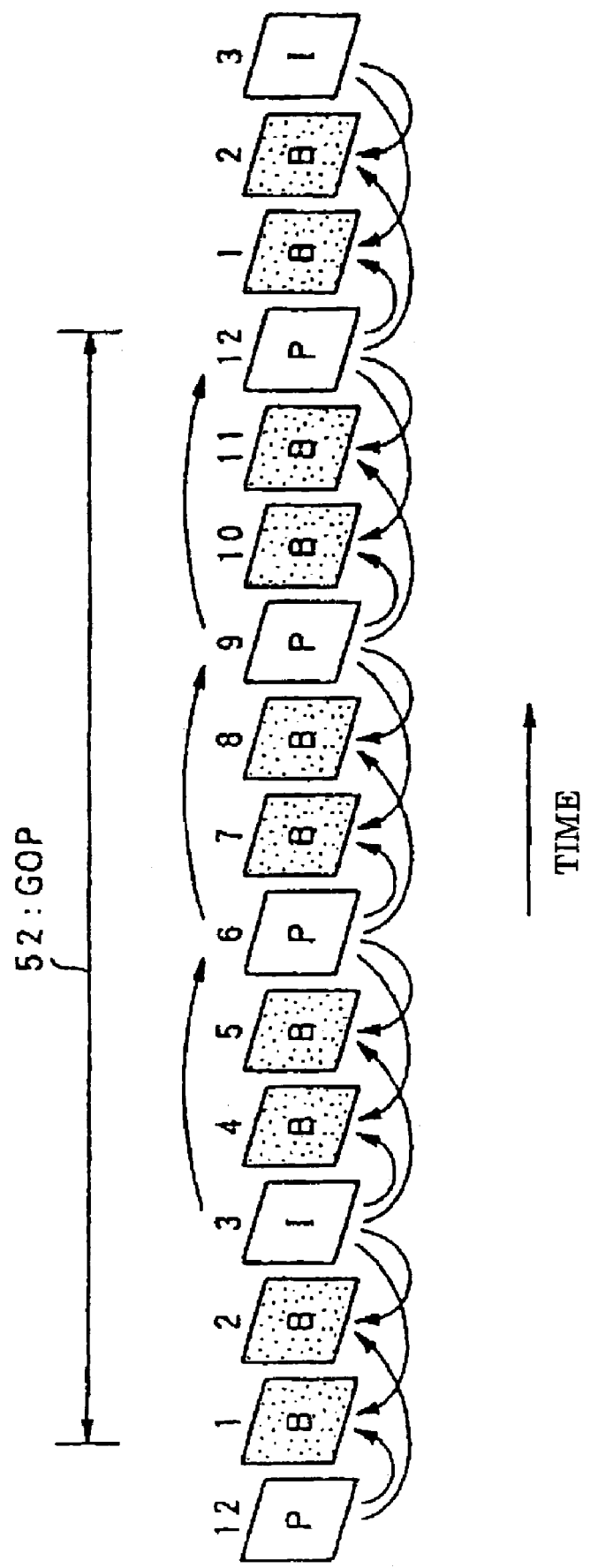
FIG. 2 is a diagram illustrating a configuration of GOP according to the DVD-video standard.
Figure 3:
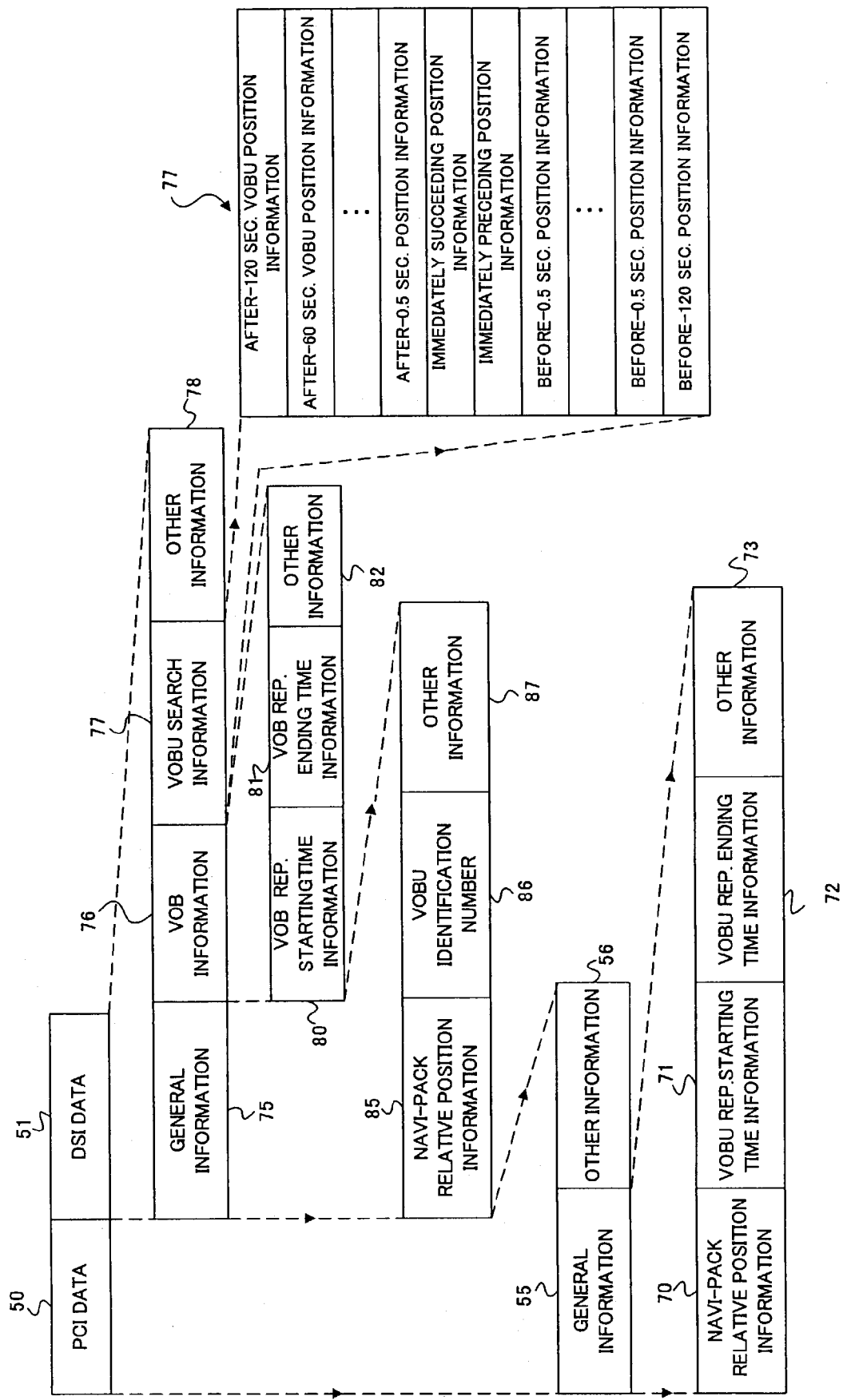
FIG. 3 is another diagram illustrating the physical recording format according to the DVD-video standard.
Figure 4:
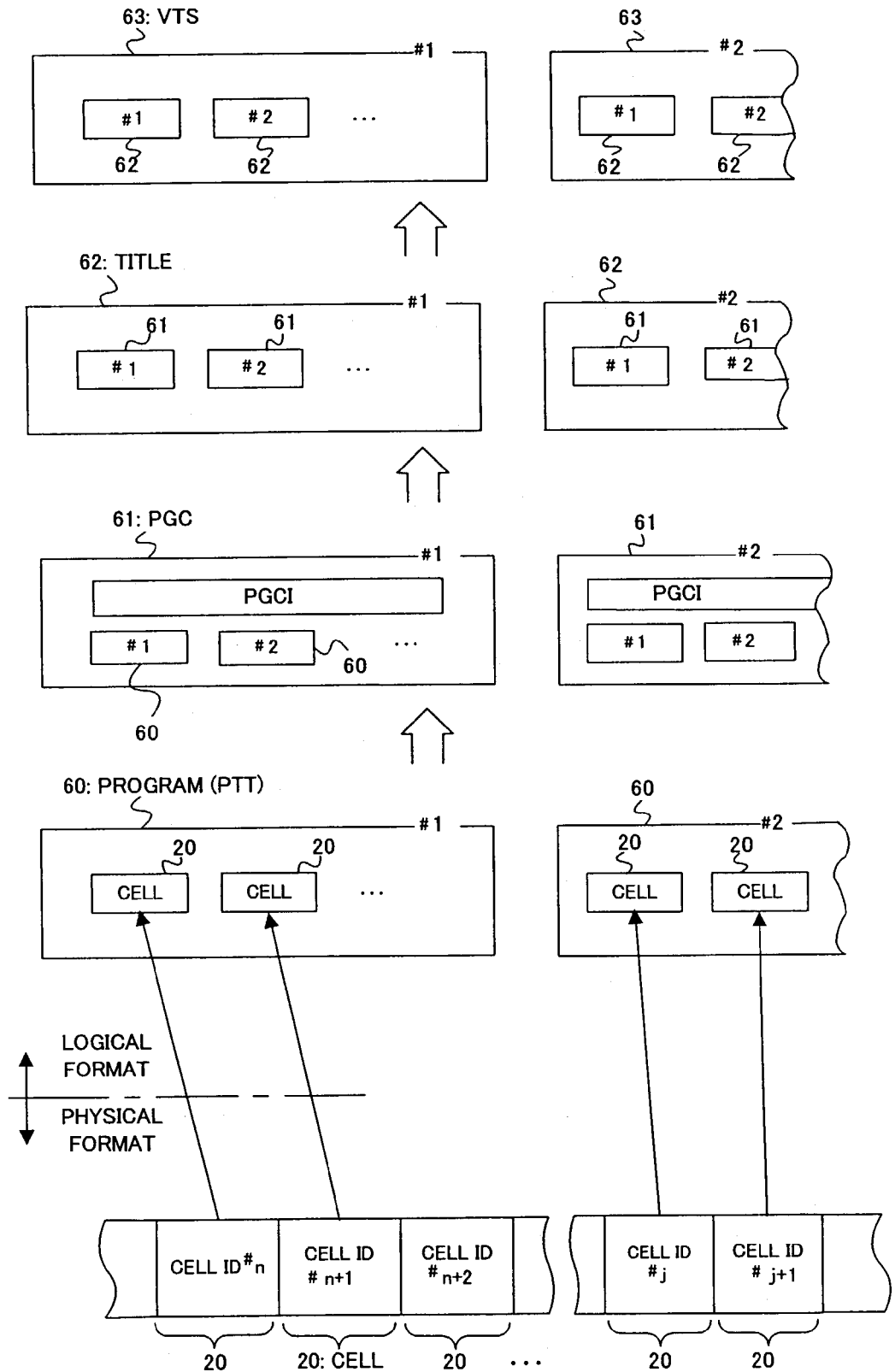
FIG. 4 is a diagram illustrating a logical format according to the DVD-video standard.

FIGS. 1 and 3 are diagrams illustrating a physical recording format in accordance with the DVD-video standard. FIG. 2 is a diagram illustrating the configuration of a GOP (Group Of Picture) in accordance with the DVD-video standard, and FIG. 4 is a diagram illustrating a logical format in accordance with the DVD-video standard.

As illustrated in FIG. 1, a DVD 1 on which recording information is recorded according to the DVD-video standard has a lead-in area LI at its innermost peripheral portion and a lead-out area LO at its outermost peripheral portion. Between the lead-in area LI and the lead-out area LO, video and audio information are recorded in such a manner that they are divided into a plurality of VTSs 3 (VTS#1 to VTS#n) each having an ID (Identification) number.

The VTS represents one set (group) of titles associated with one another (i.e., the attributes such as the number, specifications and corresponding languages of its audio information and sub-picture information contained in the titles are the same). Here, the sub-picture information is such as the subtitles in a movie, and the title is one piece of work, such as a movie, that the producer presents to the viewer. More specifically, for example, plural versions of the same movie having different languages may be recorded as different titles, and a theater edition and a special edition of the same movie may be recorded as different titles.

Immediately before the area where the VTSs 3 are recorded, a video manager 2 is recorded. The VMGI (Video Manager Information) that is recorded as the video manager 2 includes information associated with the whole of the video and audio information recorded in the DVD 1, such as a management table for managing the VMGI as a whole, menus representing the names of the respective titles, an access table to access the respective titles and backup information of those information.

The information in the above-described management table includes a search pointer that indicates the position on the DVD 1 where the respective VTS3 are recorded and attribute information of the VTS 3 recorded at the position indicated by the search pointer.

Between the video manager 2 and the lead-in area LI, there are recorded volume information 4 for discriminating the whole information recorded in the DVD 1 and file system information 5 representing a file structure of data in the video manager 2 and respective VTSs 3.

One VTS 3 is recorded as divided into control data 11 at its beginning and a plurality of VOBs 10 each having an ID number. Here, the portion constituted by a plurality of VOBs 10 is referred to as a "VOB set (VOBS)". In order to distinguish the portion of the plural VOBs 10, which is the substance of the video information and audio information, from the control data 11 which is the other data constituting the VTS 3, the term "VOB set" is used for the portion of the substance of the video and audio information.

In the control data 11 recorded at the beginning of the VTS 3, information such as PGCI (Program Chain Information) which is various kinds of information associated with the program chain and the backup information thereof are recorded as VTSI (Video Title Set Information). The program chain information is a logical division prepared by combining a plurality of cells (the cells will be described later). Also, in each VOB 10, the substantial portion of the video and audio information (i.e., the video data and audio data other than the control information) are recorded in addition to the control information.

One VOB 10 includes a plurality of cells 20 each having an ID number. One VOB 10 is completed by a plurality of cells, and one cell 20 does not bridge over two VOBs 10.

One cell 20 includes a plurality of VOB units (VOBU) each having an ID number. Here, the VOB unit 30 is a unit information that includes video information, audio information and sub-picture information.

One VOB unit 30 is constituted by a navigation pack (hereinafter referred to as "navi-pack") 41 including control information for the data included in the VOB unit 30, video data 42 which is video information, audio data 43 which is audio information and sub-picture data 44 which is sub-picture information. Here, only image data is recorded as the video data 42, and only voice and sound information are recorded as the audio data 43. Also, as the sub-picture data 44, only graphic data such as letters, figures and the like serving as sub-picture data information is recorded. It is to be noted that, the standard defines that 8 kinds of data is recordable on the DVD 1 as audio data and 32 kinds of data is recordable on the DVD 1 as sub-picture data.

Information is recorded such that the reproduction time corresponding to one VOB unit 30 (i.e., the reproduction time corresponding to the data recorded between one navi-pack 41 and an adjacent navi-pack 41) is equal to or greater than 0.4 second and is equal to or smaller than 1 second. Accordingly, at the time of reproduction, the navi-pack 41 is detected at least once per 0.4 to 1 sec.

In one VOB unit 30, the navi-pack 41 necessarily exists at the foremost position thereof. However, the video data 42, audio data 43 and sub-picture data 44 do not always need to exist within the VOB unit 30. Also, even when they exist, the number and sequential order of them can be arbitrarily set.

A division corresponding to the video data 42, audio data 43 or sub-picture data 44 illustrated in FIG. 1 is generally called "pack P".

Namely, in one VOB unit 30, the video data 42, audio data 43 and sub-picture data 44 are recorded as divided into the respective packs P. The pack P in which the video data 42 is recorded is called "video pack", the pack P in which the audio data 43 is recorded is called "audio pack", and the pack P in which the sub-picture data 44 is recorded is called "sub-picture pack". In the pack header recorded at the foremost part of the respective pack P, the read-out starting time information called "SCR (System Clock Reference)" is recorded. The SCR represents the read-out starting time on the reproduction time axis at which the information recorded on the DVD 1 is read out from the track buffer in the information reproduction apparatus and are supplied to the respective buffers. Generally, the video data 42, the audio data 43 or the sub-picture data 44 is recorded in a packet which is the recording unit obtained by dividing the pack P. However, in the DVD 1 of this embodiment, one pack P is constituted by one packet.

The "navi-pack" 41 is constituted by DSI data 51 and PCI data 50. The DSI data 51 is search information for searching for video data or audio data or the like to be reproduced and displayed (specifically the address or the like on the DVD 1 at which the video data or audio data to be reproduced and displayed is recorded). The PCI data 50 is information associated with the reproduction and display control at the time of representing the video data or audio data searched based on the DSI data 51. The DSI data 51 and the PCI data 50 are respectively recorded in the form of the DSI packet and PCI packet, each serving as a packet PT.

All video data 42 included in one VOB unit 30 are constituted by one or a plurality of GOPs.

The PCI data 50 includes highlight information that defines, for the selection items, the display and operation performed when the selection items are selected by the viewer. By the use of that highlight information, for example, the change of display for the selective items in the screen (menu screen) displaying the selective items for the viewer, the display position that is to be changed correspondingly to that selection, and the command with respect to the item selected (the command indicating the operation to be executed when the item is selected)

The picture information for displaying the frames, selection buttons and so on necessary to form and display the menu screen is recorded as the sub-picture data 44 that is the above-described sub-picture information.

The above-described GOP is a minimum and independently-reproducible unit of image that is determined in the standard of MPEG (Moving Picture Experts Group) 2, which is an image compression method and is adopted in recording video information onto the DVD 1 according to this embodiment. At the foremost position of the respective GOP, there is recorded reproduction and display time information, called "PTS (Presentation Time Stamp)", indicating the reproduction time on the reproduction time axis at which the video data 42 included in the GOP is to be displayed.

The outline of the MPEG2 method will be described. Generally, in the consecutive frame images, in many cases, the frame images located before and after one frame image are similar to each other. The MPEG2 method takes this into account. Namely, from a plurality of frame images that are transferred at interval of several frame images, intermediate frame images existing between those two transferred frame images are produced by the interpolation calculation based on the motion vectors of the original images. In this case, when recording the above intermediate frame images, only information of the difference and motion vector between the plural frame images are recorded. When reproducing, the intermediate frame images can be reproduced by referring to that difference and motion vector and by the prediction from the plurality of frame images. Thus, the compression recording of the images is executed.

Next, the outline of the GOP will be described with reference to FIG. 2. FIG. 2 illustrates an example of a plurality of frame pictures constituting one GOP. FIG. 2 illustrates a case where one GOP 52 is constituted by 12 frame pictures (in the MPEG2 system, the number of frame pictures included in one GOP 52 is not fixed). Out of those frame pictures, the frame picture represented by "I" is called "I-picture (Intra-coded picture)" and a complete frame picture can be reproduced only from the I-picture. The frame picture represented by "P" is called "P-picture" (Predictive-coded picture). This picture is a predicted picture that is produced, for example, by decoding the difference from the predicted picture which is produced from an I-picture or P-picture already decoded. The frame picture represented by B" is called "B-picture (Bi-directionally predictive-coded picture)". This frame picture is a predicted picture that is reproduced by using, for prediction, not only the I-picture or P-picture already decoded but also the I-picture, or P-picture recorded in an optical disc and corresponds to the future in terms of time. In FIG. 2, the prediction relationship between the respective pictures (the interpolation relationship) is indicated by the arrows.

The general MPEG2 system used in the DVD 1 according to this embodiment adopts a variable rate system wherein the amount of data in the respective GOP 52 is not constant. Namely, when the respective pictures included in one GOP 52 correspond to a fast-motion moving picture and the correlation between two adjacent pictures is small, the amount of data that constitutes each picture becomes large. Hence, the amount of data included in one GOP 52 also becomes large. On the other hand, when the respective pictures included in one GOP 52 correspond to a less motional moving picture and the correlation between two adjacent pictures is large, the amount of data that constructs each picture becomes small and the amount of data included in one GOP 52 also becomes small.

In the recording format having the hierarchical structure illustrated in FIG. 1 and described above, the producer can freely determine the respective divisions and record them according to his own intention. By reproducing data of the divisions according to a logical structure described later, various reproduction can be performed.

Next, the physical structure of the above-described DSI data 51 and PCI data 50 will be described by referring to FIG. 3.

First, as illustrated in FIG. 3, the PCI data 50 is constituted by general information 55 that is the main body of the PCI data 50, and other information 56.

The general information 55 is constituted by navi-pack relative position information 70 that is relative recording address information of the navi-pack 41 measured from the foremost position of the VOB 10, VOBU reproduction starting time information 71 that indicates reproduction starting time, on the reproduction time axis, of the VOB unit 30 in which that navi-pack 41 is included, VOBU reproduction ending time information 72 that indicates reproduction ending time, on the reproduction time axis, of the VOB unit 30, and other information 73.

The DSI data 51 is constituted by general information 75 that is the main body of the DSI data 51, VOB information 76 associated with the VOB 10 to which the navi-pack 41 belongs, VOBU search information 77 indicating the recording positions on the DVD 1 of other VOB units 30 to be reproduced before and after the VOB unit 30 to which that navi-pack 41 belongs, and other information 78.

The general information 75 is constituted by navi-pack relative position information 85 similar to the navi-pack relative position information 70, a VOBU identification number 86 for discriminating the VOB unit 30 to which that navi-pack 41 belongs, and other information 87.

The VOB information 76 is constituted by VOB reproduction starting time information 80 indicating the reproduction starting time, on the reproduction time axis, of the VOB 10 to which the VOB unit 30 including the navi-pack 41 belongs, VOB reproduction ending time information 81 indicating the reproduction ending time, on the reproduction time axis, of that VOB 10, and other information 82.

The VOB search information 77 includes, as a list as illustrated in FIG. 3, position information representing the recording positions on the DVD 1 of the VOB units 30 of subsequent to and prior to the VOB unit 30 to which the navi-pack 41 belongs, and the position information representing the recording positions on the DVD 1 of the other VOB units 30 to be reproduced within a range of 120 seconds before and after the reproduction starting time of the VOB unit 30.

Next, the logical format (logical structure) formed by combining information recorded as the physical divisions illustrated in FIG. 1 or 3 will be described with reference to FIG. 4. It is to be noted that, regarding the logical structure illustrated in FIG. 4, information is not actually recorded on the DVD 1 as illustrated in that structure. Namely, information for combining and reproducing the respective data (especially the cells 20) illustrated in FIG. 1 according to the logical structure shown in FIG. 4 (i.e., access information or time information or the like) is recorded, especially, in the control data 11 on the DVD 1.

For clarification, the description will be given from the lowermost hierarchical section in FIG. 4. Out of the physical structure described with reference to FIG. 1, by selecting a plurality of the cells 20 and combining them, one program 60 is logically constructed according to the producer's intention. The program 60 is a minimum logical unit that the system controller of the above-described information reproducing apparatus is able to discriminate its division and access by a relevant command. The producer can also define one or a plurality of programs 60 as a minimum unit that the viewer can freely select and watch. This unit is called "PTT (Part of Title)".

Since one program 60 is logically constructed by selecting a plurality of cells 20, it is also possible for the producer to use one cell 20 in a plurality of programs 60, namely, to reproduce one cell 20 in a plurality of different programs 60. This is called "common use of cell 20".

Regarding the number of cell 20, the cell ID number is used when handling the cell 20 in connection with the physical format illustrated in FIG. 1 (in FIG. 1 it is shown as the cell ID#). When handling the cell 20 in connection with the logical format illustrated in FIG. 4, the cell number which is in the sequential order of description in the PGCI described later is used.

By combining a plurality of programs 60, one PGC (Program Chain) 61 is logically constructed according to the producer's intention. The above-described PGCI is defined in units of the PGC 61. The PGCI 61 includes the sequential order of reproduction (a specific program number is allotted to every program 60 in accordance with the sequential order of reproduction) of the cells 20 included in every program 60 when reproducing the respective program 60, the addresses that are the recording positions of the respective cells 20 on the DVD 1, the number of the foremost cell 20 to be reproduced in one program 60, the methods of reproducing the respective programs 60 and various kinds of commands (the command that the producer can designate for every PGC 61 or cell 20). In the case that information is recorded on the DVD 1 of this embodiment, at the time of reproduction, the producer can select, for every PGC 61, any one of a normal reproduction, a random reproduction and a shuffle reproduction. The random reproduction uses a random number and therefore it is possible that the same program 60 is reproduced for a plurality of times. The shuffle reproduction is a random reproduction that uses a random number similar to the random reproduction, but each program 60 is reproduced only once and it doesn't happen that the same program 60 is reproduced for a plurality of times.

The recording position on the DVD 1 of the PGCI is within the control data 11 (see. FIG. 1) as described above. However, if the PGCI relates to the menus within the video manager 2, the recording position of that PGCI is within the control data (not shown) in the video manager 2.

In addition to the above-described PGCI, substantial video and audio data are included in one PGCI 61 as a combination of the programs 60 (in other words, as the combination of the cells 20).

In one PGC 61, it is also possible to make the common use of the cells 20 (namely using the same cell 20 by different PGCs 61) that has been described in connection with the program 60. Also, as to the cells 20 that are used, the producer can select a method of reproducing the cells 20 in the order in which they are recorded (i.e., the reproduction of consecutively disposed cells) and a method of reproducing the cells 20 regardless of the order in which the cells are recorded on the DVD 1 (e.g., reproducing the cells 20, that are recorded later, earlier, i. e., the reproduction of non-consecutively disposed cells).

By one or a plurality of PGC 61, one title 62 is logically constituted. This title 62 is a unit that corresponds to, for example, a piece of movie, and that is complete information that the producer wants to present to the viewer of the DVD 1.

By one or a plurality of titles 62, one VTS 63 is logically constituted. The titles 62 included in the VTS 63 have a common attribute. For example, different language versions of the same movie correspond to the respective titles 62. The information corresponding to one VTS 63 illustrated in FIG. 4 corresponds to the information included in one VTS 3 illustrated in FIG. 1. Namely, in the DVD 1, all the information logically included within the VTS 63 shown in FIG. 4 is recorded as one VTS 3.

The producer designates the information divided in the physical structure according to the logical format described above to produce the title (a movie, etc.) to be presented to the viewer.

Embodiment of the DVD-RW

Next, the DVD-RW on which information is recorded by the information recording apparatus of the embodiment will be described with reference to FIG. 5.

Figure 5:
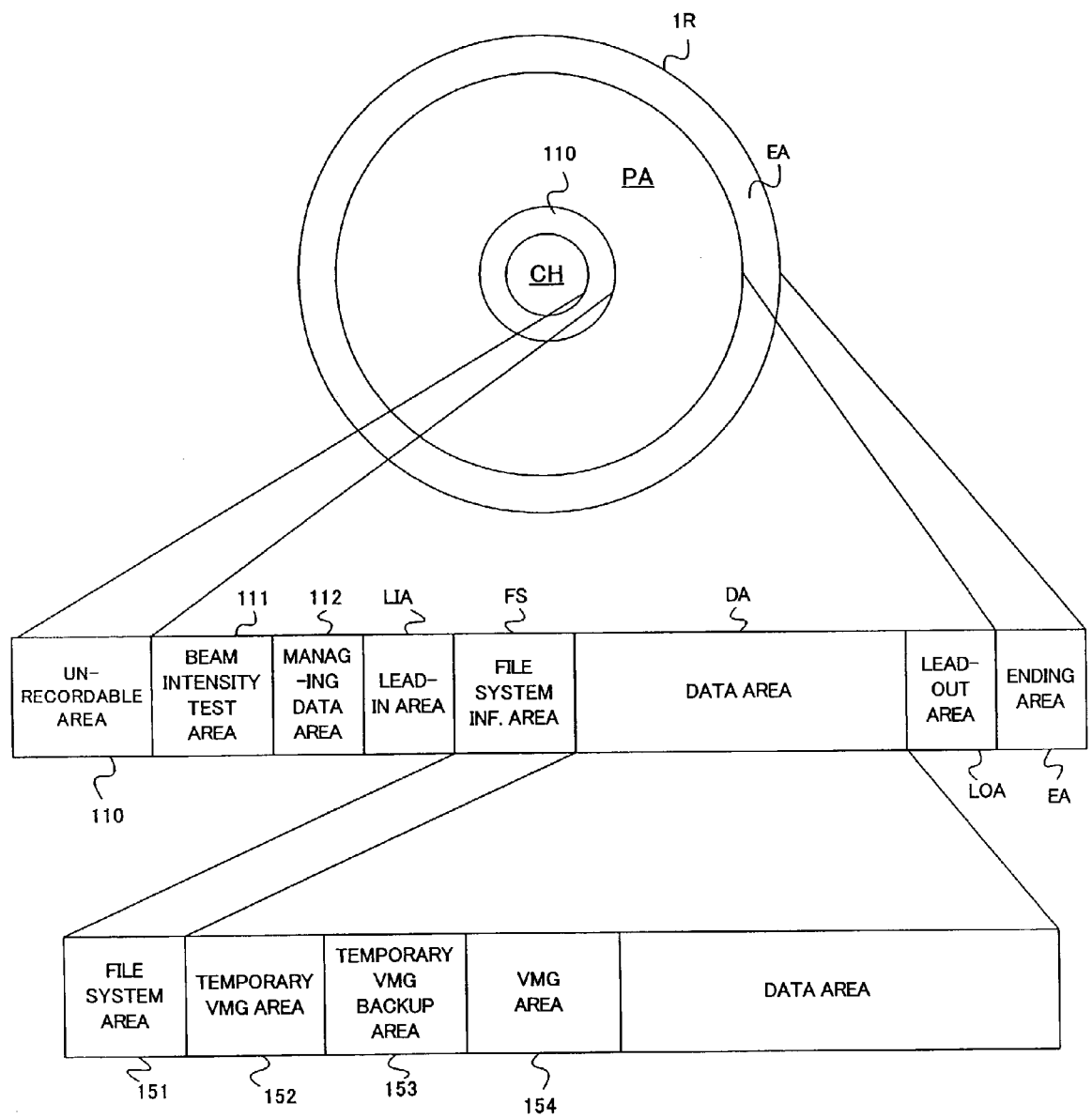
FIG. 5 is a diagram illustrating the physical recording format of to a DVD-RW.

It is noted that FIG. 5 shows a plan view of an appearance and a diagram of the physical recording format of the DVD-RW according to the embodiment.

The DVD-RW of the embodiment is an optical disc having the recording layer of, for example, a change-of-phase material and that enables recording for approximately a thousand times. In the appearance, the DVD-RW has, at its center, a center hole CH which is held by a spindle motor for rotating it provided in an information reproducing apparatus or an information recording apparatus. In addition, the DVD-RW also has, from the inside thereof, a non-recordable area 110 at the inner peripheral side in which information cannot be recorded, a recordable area PA in which information can be recorded, and an ending area EA on the outer-peripheral side in which information cannot be recorded.

The recordable area PA includes a beam intensity test area 111 for recording test information for setting the intensity of a light beam used for recording the recording information, a management data area 112 for recording the data of the intensity of the light beam thus set and management data as later described in the process of recording, a lead-in area LIA in which reproduction starting information read out at the time of starting the reproduction of the recorded information is recorded in the process of recording the recording information, a file system information area FS for recording the file system information indicating the file structure of the recording information, a data area DA for actually recording the recording information, and a lead-out area LOA in which the ending information read out at the time of ending the reproduction of the recorded information is recorded in the process of recording.

The file system information area FS is constituted by a file system area 151. The file system area 151 records the file system information indicating the file structure of the information recorded in the DVD-RW. The data area DA includes a temporary VMG area (TMP_VMG) 152, a temporary VMG backup area (TMP_VMG_BUP) 153, a VMG area 154 and a data area. The temporary VMG area 152 is an area for temporarily recording temporary VMGI (Temporary Video Manager Information: TMP_VMGI) for temporarily managing the recording information when information such as video and audio data are recorded in the data area DA. In the DVD-RW, until the disc is finalized by the user's instruction, the file system information is not written into the file system area 151 and the VMGI is not written into the VMG area 154. Accordingly, until the finalize processing is executed, the temporary VMGI for temporarily managing the recorded information is recorded in the temporary VMG area 152 and, simultaneously, the same temporary VMGI is also recorded in the temporary VMG backup area 153. As mentioned above, the VMG area 154 is an area in which the VMGI is recorded when the DVD-RW is finalized.

Next, The recording of information by a restricted overwrite recording method will be described. FIGS. 6A to 6D illustrate an example of recording sequence according to the restricted overwrite recording method. It is now assumed that there is a blank DVD-RW disc on which no data is recorded. First, as illustrated in FIG. 6A, null data ("0" data) is recorded into the file system information area FS and the area within the data area DA up to the position from which the recording of the first VOB is started (this operation will be hereinafter called "padding"), thereby to initialize the recording area. As a result, the area of the file system information area FS and the area of the data area DA up to the first VTSI become data rewritable state. The NWA (Next Writable Address) that indicates the next writing position is set to the beginning position of the first VOB within the data area DA.

In this state, when the user inputs a recording-starting instruction by operating the recording button of the information recording apparatus, for example, the information recording apparatus records data from the position indicated by the NWA onto the DVD-RW as VOB as illustrated in FIG. 6B. By continuing the recording, the data is sequentially recorded into the data area DA of the DVD-RW as a plurality of VOBs. When the user instructs ending the recording by operating a stop button or the like of the information recording apparatus, the information recording apparatus produces a VTSI corresponding to one or a plurality of VOBs that have been recorded by that time and records it on the area succeeding those VOBs as the VTSI backup information (VTSI_BUP). Further, the information recording apparatus performs the padding of null data on the area succeeding the VTSI_BUP for the data amount of the VTSI corresponding to the next title. Thus, the NWA is set at the recording start position of the next VOB.

The reason why null data is recorded up to the recording start position of the next VOB is as follows. When the user inputs a recording-starting instruction, the information recording apparatus must immediately start to record data as the VOB. Namely, after the recording-starting instruction is input, there is no time for padding the VTSI area for the titles recorded at that time. Therefore, at the end of previous recording, the padding is performed for the VTSI area in which titles are recorded next time so that recording the VOB may be started immediately after the recording-starting instruction is input. By this, when the user inputs the recording-ending instruction after recording the VOB, the VTSI can be recorded on the VTSI area for which the padding has been already completed.

Thereafter, the information recording apparatus moves the pickup toward the inner-peripheral side of the DVD-RW and, as illustrated in FIG. 6C, records the VTSI on the inner-peripheral side of one or a plurality of VOBs recorded this time. The data content of the VTSI recorded is the same as the data contents previously recorded in the VTSI_BUP. Thus, recording one title is completed. Namely, as illustrated in FIG. 6C, one title is constituted by the VTSI, one or a plurality of VOBs (shown as the VOBS) and VTSI_BUP in the order from the inner-peripheral side of the disc. This one title corresponds to the data that the user recorded by one operation. For example, when the user records a TV program, he instructs the recording start when that program starts and also instructs the recording end when that program ends. The continuous data thus recorded corresponds to one title.

When the user records a next program, the above processing described in connection with FIGS. 6B and 6C is repeated. Namely, one or a plurality of VOBs are recorded from the NWA position. When the user inputs an instruction to end the recording, the VTSI corresponding to the VOBs recorded by that time is produced and recorded in the VTSI_BUP. Further, null data is recorded by padding up to the recording start position of the next VOB. Then, the pickup returns to the position inside of the VOB and records the VTSI.

Every time the user records data in such a manner, one title is recorded on the disc. However, in that state, the file system information and VMGI information have not been recorded yet, as illustrated in FIG. 6C. Accordingly, as described later, the temporary VMGI for the titles already recorded on the disc at that time is recorded into the temporary VMG area 152 and the temporary VMG backup area 153. Then, when the user inputs the finalize instruction, the information recording apparatus produces the file system information and VMGI that correspond to the information of title recorded on the disc at that point of time, as illustrated in FIG. 6D. Then, the information recoding apparatus records the file system information into the file system area 151 in the file system information area FS and records the VMGI into the VMG area 154.

Next, the method of recording the temporary VMGI will be described. In the present invention, the temporary VMGI is recorded in the temporary VMG area 152 and the temporary VMG backup area 153. The reason why the same temporary VMGI is recorded in two areas is to enable reading the VMGI from one of those two areas if the other one of those two areas become unreadable for the physical deterioration or other reason, thereby ensuring the safety. At that time, even when the titles are recorded for a plurality of times, the temporary VMGI is generally recorded at the same position. However, if the writing error, the read-out error or the verifying error of the temporary VMGI (hereinafter those errors are referred to collectively as "an access error") takes place at that recording position due to the repeated recording of the temporary VMGI for many times, the recording position of the temporary VMGI information is changed in each of the temporary VMG area 152 and temporary VMG backup area 153. By this, even when a plurality of titles are recorded in the disc by the recording of a plurality of times and hence the recording position of the temporary VMGI that has been repeatedly rewritten become physically deteriorated, the temporary VMGI is recorded in the changed or shifted position. Therefore, correct writing and recording of the temporary VMGI is ensured.

Further, in the present invention, the recording position information of the respective temporary VMGIs in the temporary VMG area 152 and in the temporary VMG backup area 153 are recorded in two areas, i.e., a first and a second anchor areas in the file system area 151. As mentioned above, since the recording positions of the temporary VMGI in the temporary VMG area 152 and temporary VMG backup area 153 are changed, the information of the position where the temporary VMGI effective at the present time (i.e., the latest temporary VMGI) is recorded is recorded in the anchor areas in the file system area 151. Specifically, the recording position (address) information of the effective temporary VMGI in the temporary VMG area 152 is recorded in the first anchor area in the file system area 151, and the recording position information of the effective temporary VMGI in the temporary VMG backup area 153 is recorded in the second anchor area in the file system area 151. Thus, by referring to one of the first and second anchor areas, it is possible to know the position where the temporary VMGI effective at that time is recorded and thereby to obtain the effective temporary VMGI.

Next, the method of recording the temporary VMGI (TEMP_VMGI) when the titles are recorded on the disc will be described more specifically. FIGS. 7A to 7E illustrate the recording sequence of the temporary VMGI in the DVD-RW. It is to be noted that, in this embodiment, it is assumed that the file system area 151 is allotted to the area from the 0th to the 300h-th [h:hexadecimal (hexadecimal number)] address, the temporary VMG area 152 is allotted to the area from the 300th to the 500h-th address, the temporary VMG backup area 153 is allotted to the area from the 500th to the 700h-th address, and the VMG area 154 is allotted to the area from the 700th to 3000h-th address, as illustrated. Also, the 2C0h-th address in the file system area 151 is allotted to the first anchor area 160 and the 2E0h-th address in the file system area 151 is allotted to the second anchor area 161.

FIG. 7A illustrates the status of the DVD-RW before the temporary VMGI is written. The temporary VMG area 152 and temporary VMG backup area 153 are unrecorded, and the first anchor area 160 and second anchor area 161 are also unrecorded.

Next, when one title is recorded according to the user's recording instruction in such a way as described by referring to FIGS. 6A to 6D, temporary VMGI is produced for one or a plurality of titles, including that one title, recorded on the disc at that point of time. The temporary VMGI thus produced is recorded in the temporary VMG area 152 and the temporary VMG backup area 153. Specifically, as illustrated in FIG. 7B, the temporary VMGI (TEMP_VMGI) is recorded in the foremost portion of the temporary VMG area 152, i.e., the area of 10h (1 sector=1 ECC block) from the 300h-th address and in the foremost portion of the temporary backup area 153, i.e., the area of 10h from the 500h-th address. Further, the recording addresses of the temporary VMGI in the temporary VMG area 152 and in the temporary VMG backup area 153 (i.e., "300h" and "500h") are recorded, as anchor point information, into both the first anchor area 160 and the second anchor area 161. Namely, the anchor point information is the pointer information that indicates the recorded position of the temporary VMGI, which is effective at that point of time, within the temporary VMG area 152 and the temporary VMG backup area 153. The reason why the anchor point information indicating the recorded position of the temporary VMGI in the temporary VMGI area 152 and in the temporary VMG backup area 153 (i.e. "300h" and "500h") are recorded in each of the first anchor area 160 and the second anchor area 161 is that, even if either one of the first anchor area 160 and the second anchor area 161 becomes unreadable, the recording position information of the temporary VMGI can be obtained from the other one of the anchor areas and hence the safety is ensured.

In this way, the temporary VMGI for the title recorded on the disc is recorded in the temporary VMG area 152 and in the temporary VMG backup area 153, and further the recording positions of the temporary VMGI are recorded in the first anchor area 160 and second anchor area 161. Therefore, the information reproducing apparatus can obtain the recording position of the temporary VMGI from the first anchor area 160 and second anchor area 161 and access that position to obtain the temporary VMGI.

When the user repeatedly records the contents of a TV broadcasting program or else, the contents are recorded, as one title, into the data area DA of the disc. Also, every time a new title is thus recorded, the temporary VMGI for all the titles, including that new title, already recorded in the disc at that point of time is produced, and the temporary VMGI thus produced is recorded in the temporary VMG area 152 and temporary VMG backup area 153.

At the time of recording the temporary VMGI, after the temporary VMGI is recorded, the temporary VMGI thus recorded is read out to confirm (verify) whether or not the information is correctly recorded. At this time, unless the access error occurs, the temporary VMGI is recorded on the same recording positions. Namely, in the above example, the temporary VMGI is recorded from 300 to 310h-th addresses in the temporary VMG area 152 and from 500 to 510h-th addresses in the temporary VMG backup area 153, unless the access error takes place. However, if an access error takes place in recording the temporary VMGI, the recording position of the temporary VMGI in the temporary VMG area 152 and in the temporary VMG backup area 153 are changed. This is because, since it is highly possible that the recording position of the disc at which the access error has occurred has the physical deterioration or else, it is safer that the position is not used any more.

In changing (shifting) the recording position of the temporary VMGI in the temporary VMG area 152 and the temporary VMG backup area 153, basically an unused area may be used which is different from the recording area that had so far been used. However, if the access error to the temporary VMGI has once occurred, there is a possibility that a recording area adjacent to that recording area also has deterioration, abnormality or else on its recording surface of the disc. Therefore, it is preferable that the temporary VMGI is written from a position spaced, by the distance corresponding to a predetermined amount of data, from the position where the access error took place. In the above-described example, since the temporary VMGI is recorded for an amount corresponding to 1 sector, if an access error has occurred at the recording position of the latest temporary VMGI, the temporary VMGI may be written from a position that is spaced by 1 sector from the disqualified recording area. As a result of this, even when deterioration or abnormality or the like exists on the disc continuously over a certain region, the temporary VMGI can be correctly recorded.

FIGS. 7A to 7E illustrates the examples of writing the temporary VMGI information. If an access error takes place in the state the temporary VMGI is recorded in the positions in the temporary VMG area 152 and in the temporary VMG backup area 153 as shown in FIG. 7B, the temporary VMGI is recorded from the 320h-th address in the temporary VMG area 152 and the 520h-th address in the temporary VMG backup area 153, respectively, with the space of 1 sector from the position where the access error tool place, as illustrated in FIG. 7C. Also, the recording positions of the new temporary VMGI are recorded in the first anchor area 160 and second anchor area 161. In the example of FIG. 7C, the addresses "320h" and "520h" are recorded in each of the first anchor area 160 and second anchor area 161 as the anchor point information.

Thereafter, until another access error occurs, the information recording apparatus produces new VMGI each time a new title is recorded on the disc, and records the new VMGI from the 320h-th address and 520h-th address. Then, if an access error takes place in one of the recording positions of the temporary VMGI, the temporary VMGI is recorded from the 340h-th address in the temporary VMG area 152 and the 540h-th address in the temporary VMG backup area 153, respectively, with the space of 1 sector from position where the access error took place. The position information of the VMGI is recorded into each of the first anchor area 160 and second anchor area 161.

In this way, the information recording apparatus records the temporary VMGI into the same recording positions unless an access error occurs, and changes the recording position of the temporary VMGI and records it if an access error takes place. Accordingly, even when deterioration, abnormality or else occurs on the disc surface because of the recording of the temporary VMGI for a plurality of times, the temporary VMGI can be correctly recorded by changing the recording position of the temporary VMGI.

If the recording position of the temporary VMGI is changed each time an access error occurs, as illustrated in FIG. 7E, the recording position of the temporary VMGI moves up to the end areas of the temporary VMG area 152 and temporary VMG backup area 153. Thus, the temporary VMGI cannot be recorded any more, and therefore recording the contents on the disc is disabled. In this example, the recording position of the temporary VMGI can be shifted up to 16 times. Also, the recording positions of the temporary VMGI written on the first anchor area 160 and second anchor area 161 are rewritten for 16 times at maximum. In this way, the frequency of recording data on the disc is limited by the recording capacity of the temporary VMG area 152 and temporary VMG backup area 153. However, actually, since the possibility of the access error during the recording of the temporary VMGI is low, it is rare that the temporary VMG area 152 or the temporary VMG backup area 153 is used up.

Regarding the shifting of the recording position of the temporary VMGI, when an access error occurred in recording the temporary VMGI in either one of the temporary VMG area 152 and temporary VMG backup area 153, it is preferable to shift the recording position of the temporary VMGI in both of those areas. Namely, as illustrated in FIG. 7C, even when an access error occurred during the recording of the temporary VMGI into the 300 to 310h-th address in the temporary VMG area 152 (indicated by the mark "x" in the figures) but no error occurred during the recording of the temporary VMGI into the 500 to 510h-th address in the temporary VMG backup area 153, it is preferable to shift the recording positions of the temporary VMGI in the temporary VMG area 152 and temporary VMG backup area 153 to the 320 to 330h-th address and the 520 to 530h-th address, respectively. The reason for this is as follows. If the recording position of the temporary VMGI is changed only for the area where the access error occurred, the correspondence between the recording position of the effective temporary VMGI in the temporary VMG area 152 and in the temporary VMG backup area 153 becomes complicated.

In the above example, the temporary VMGI is recorded over the area of one sector, and the temporary VMGI is recorded on the new recording position spaced by one sector when an access error occurs. Namely, the spacing by which the recording position of the temporary VMGI is shifted corresponds to the necessary recording area of the temporary VMGI. This is advantageous in that the recording of the temporary VMGI and the shifting of the recording position thereof can be controlled by the same unit of data, and hence the control becomes simple. However, that is not prerequisite. It is also possible to shift the recording position of the temporary VMGI by the amount that is different from the necessary recording area of the temporary VMGI.

[Information Recording and Reproducing Apparatus]

Figure 8:
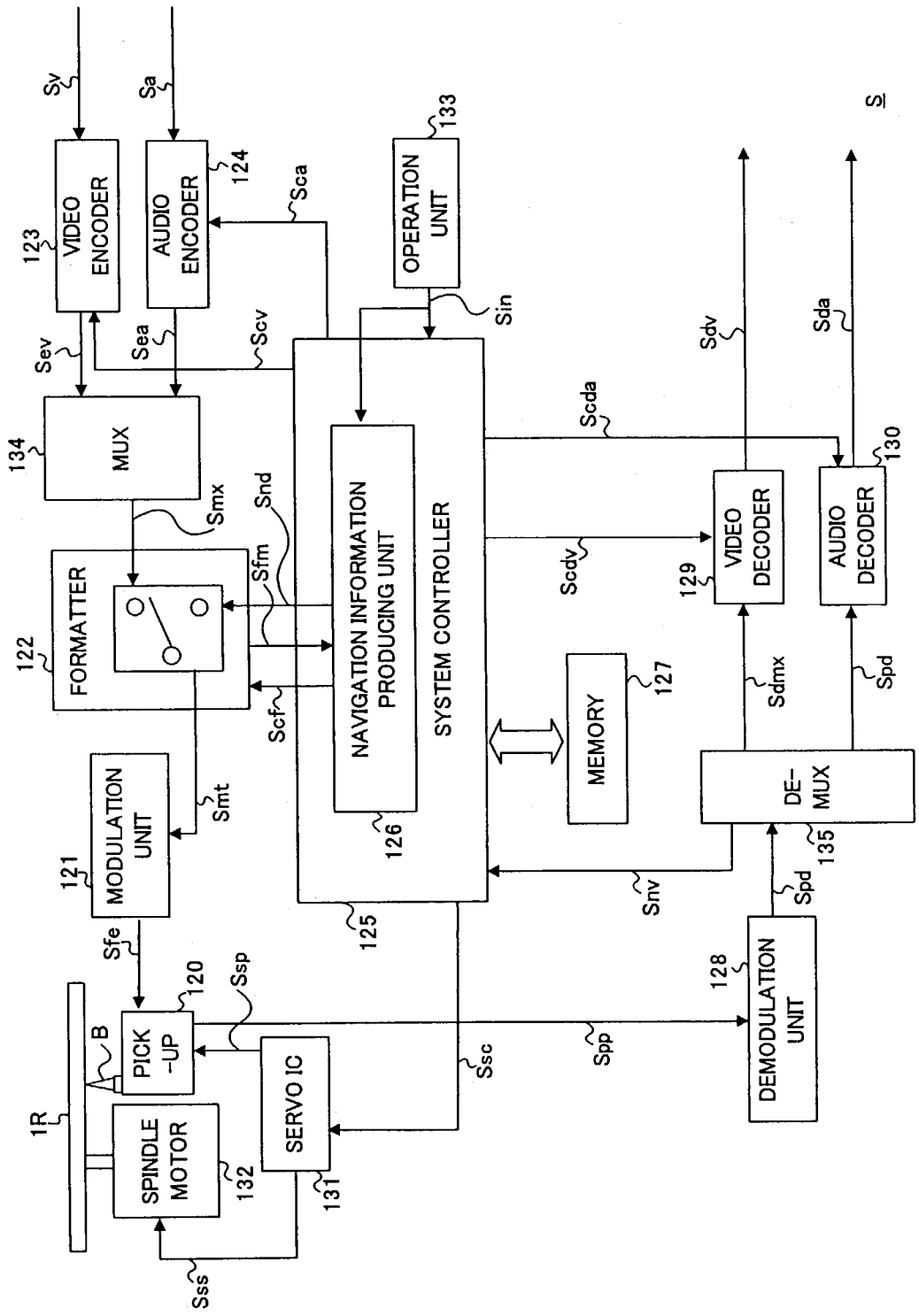
FIG. 8 is a block diagram illustrating a schematic configuration of an information recording and reproducing apparatus according to the present invention.

The information recording and reproducing apparatus for recording information on the DVD-RW in accordance with the above-described DVD-video standard and for reproducing the information recorded from the DVD-RW will be described with reference to FIG. 8. FIG. 8 is a block diagram illustrating the schematic configuration of the information recording and reproducing apparatus according to the embodiment.

As illustrated in FIG. 8, the information recording and reproducing apparatus S according to the embodiment includes a pickup 120, a modulation unit 121, a formatter 122, a video encoder 123, an audio encoder 124, a system controller 125, a memory 127, a demodulation unit 128, a video decoder 129, an audio decoder 130, a servo IC (Integrated Circuit) 131, a spindle motor 132, an operation unit 133, a multiplexer 134, and a de-multiplexer 135. Also, the system controller 125 includes a navigation information producing unit 126 that produces the above-described navi-pack 41, etc.

The outline of the operation of the respective parts will be described.

The spindle motor 132 rotates the disc 1R that is loaded, with a preset number of rotations, according to the spindle control signal Sss supplied from the servo IC 131.

On the other hand, the video information Sv that is the recording information to be recorded in the data area DA of the disc 1R is input from the outside and then is input into the video encoder 123.

According to a control signal Scv from the system controller 125, the video encoder 123 executes encoding processing at a preset encoding rate onto the video information Sv. Specifically, that encoding processing is, for example, compression encoding processing according to the MPEG2 system described above. This processing is performed with the encoding rate such that the reproducing period of time for reproducing one VOB unit 30 becomes 0.5 second. That time duration of 0.5 second corresponds to the period of time for reproducing 15 video frames in a so-called "NTSC (National Television System Committee) system". Thereby, the video encoder 123 produces an encoded video signal Sev and supplies it to the multiplexer 134.

On the other hand, the audio information Sa that is the recording information to be recorded in the data area DA of the disc 1R is input from the outside and is input to the audio encoder 124.

According to a control signal Sca from the system controller 125, the audio encoder 124 executes encoding processing on the audio information Sa at a preset encoding rate. Specifically, that encoding processing is, for example, compression encoding processing according to the MPEG2 system as described above. Namely, as in the case of the video information Sv, the encoding processing is performed with the encoding rate such that the reproducing period of time for reproducing one VoB unit 30 becomes 0.5 second. The audio encoder 124 thereby produces an encoded audio signal Sea and supplies it to the multiplexer 134.

As a result, the multiplexer 134 multiplexes the image information and audio information included in the encoded video signal Sev by a predetermined processing to thereby produce a multiplexed signal Smx. Then the multiplexer 134 outputs the multiplexed signal Smx to the formatter 122.

At this time, the multiplexer 134 passes the encoded audio signal Sea as the multiplexed signal Smx without applying any special processing.

The formatter 122, according to a control signal Scf from the system controller 125, mixes the navigation information signal Snd from the navigation information producing unit 126 described later and the multiplexed signal Smx to produce a format signal Smt in accordance with the physical format illustrated in FIG. 1 or 3, and outputs the format signal Smt to the modulation unit 121.

At this time, the respective recording information input to the formatter 122 as the multiplexed signal Smx are supplied to the system controller 125 as the recording information signal Sfm at predetermined timings so that the navigation information producing unit 126 uses those information to produce the navigation information.

The modulation unit 121 executes predetermined modulation processing (e.g., so-called "8-16 modulation processing") on the format signal Smt to produce a modulated signal Sfe, and outputs it to the pickup 120.

The pickup 120 produces a light beam B whose intensity is modulated by the modulated signal Sfe and irradiates the light beam B onto the information track within the information recording surface of the disc 1R. Thus, the pickup 120 forms, on the information tracks, the pits corresponding to the navigation information and the respective recording information included in the modulated signal Sfe. Thereby, the pickup 120 records that navigation information and respective recording information onto the disc 1R in accordance with the physical format illustrated in FIG. 1 or 3.

At this time, the deviation between the focusing position of the light beam B and the information tracks in the vertical and horizontal directions of the information recording surface are eliminated by moving the objective lens's (the objective lens's for focusing the light beam B) in the pickup 120 in the vertical and horizontal directions (i.e., the so-called "focus servo control" and "tracking servo control" are performed) according to the pickup servo signal Ssp output from the servo IC 131.

The servo IC 131, according to a control signal Ssc from the system controller 125, produces the spindle control signal Sss and a pickup servo signal Ssp and outputs them to the spindle motor 132 and the pickup 120, respectively.

When reproducing the information recorded on the disc 1R, the pickup 120 produces a reproducing light beam B having a predetermined intensity and irradiates it onto the information tracks on which the pits are formed. Based on the reflected light, the pickup 120 produces a detection signal Spp corresponding to the recorded information and outputs it to the demodulation unit 128.

The demodulation unit 128 executes, on the detection signal Spp, demodulation processing that corresponds to the modulation processing executed in the modulation unit 121 to produce a demodulated signal Spd, and outputs it to the de-multiplexer 135.

When the demodulated signal Spd includes the video information, the de-multiplexer 135 separates the image information and voice/sound information in that video information, to thereby produce a separated (de-multiplexed) signal Sdmx and outputs it to the video decoder 129.

On the other hand, when the demodulated signal Spd only includes the audio information, the de-multiplexer 135 passes the demodulated signal Spd as it is and supplies it to the audio decoder 130.

Based on a control signal Scdv from the system controller 125, the video decoder 129 executes, on the de-multiplexed signal Sdmx, decoding processing that corresponds to the encoding processing at the encoding rate executed in the video encoder 123 to produce a decoded video signal Sdv and outputs it to an outside monitor, not illustrated.

Based on a control signal Scda from the system controller 125, the audio decoder 130 executes, onto the demodulated signal Spd including the audio information, decoding processing that corresponds to the encoding processing at the encoding rate executed in the audio encoder 124 to produce a decoded audio signal Sda, and outputs it to an outside amplifier, not illustrated.

When the operation for executing the recording processing or reproduction processing of the information recording and reproducing apparatus S is performed by the user, the operation unit 133 produces an operation signal Sin corresponding to that operation and outputs it to the system controller 125.

In addition, when the edit processing for editing (more specifically deleting) the contents already recorded on the disc 1R is executed in the recording processing, the operation unit 133 produces the operation signal Sin indicating the edited contents and outputs it to the system controller 125.

The navigation information producing unit 126, based on the control that the system controller 125 performs according to the operation signal Sin and the recording information signal Sfm, produces the navigation information signal Snd including the navigation information to be recorded on the disc 1R during the recording processing or the editing processing, and outputs the signal Snd to one of the input terminals of the formatter 122.

Thus, the formatter 122 mixes the recording information in the multiplexed signal Smx and the navigation information in the navigation information signal Snd to produce the format signal Smt including the recording information according to the physical format illustrated in FIG. 1 or 3.

In parallel with this operation, the system controller 125 produces the respective control signals Scv, Sca, Scf, Ssc, Scdv, and Scda for controlling the above-described respective operations, and outputs them to the corresponding units while supplying and receiving necessary information as a memory signal Sm with the memory 127.

Figure 9:
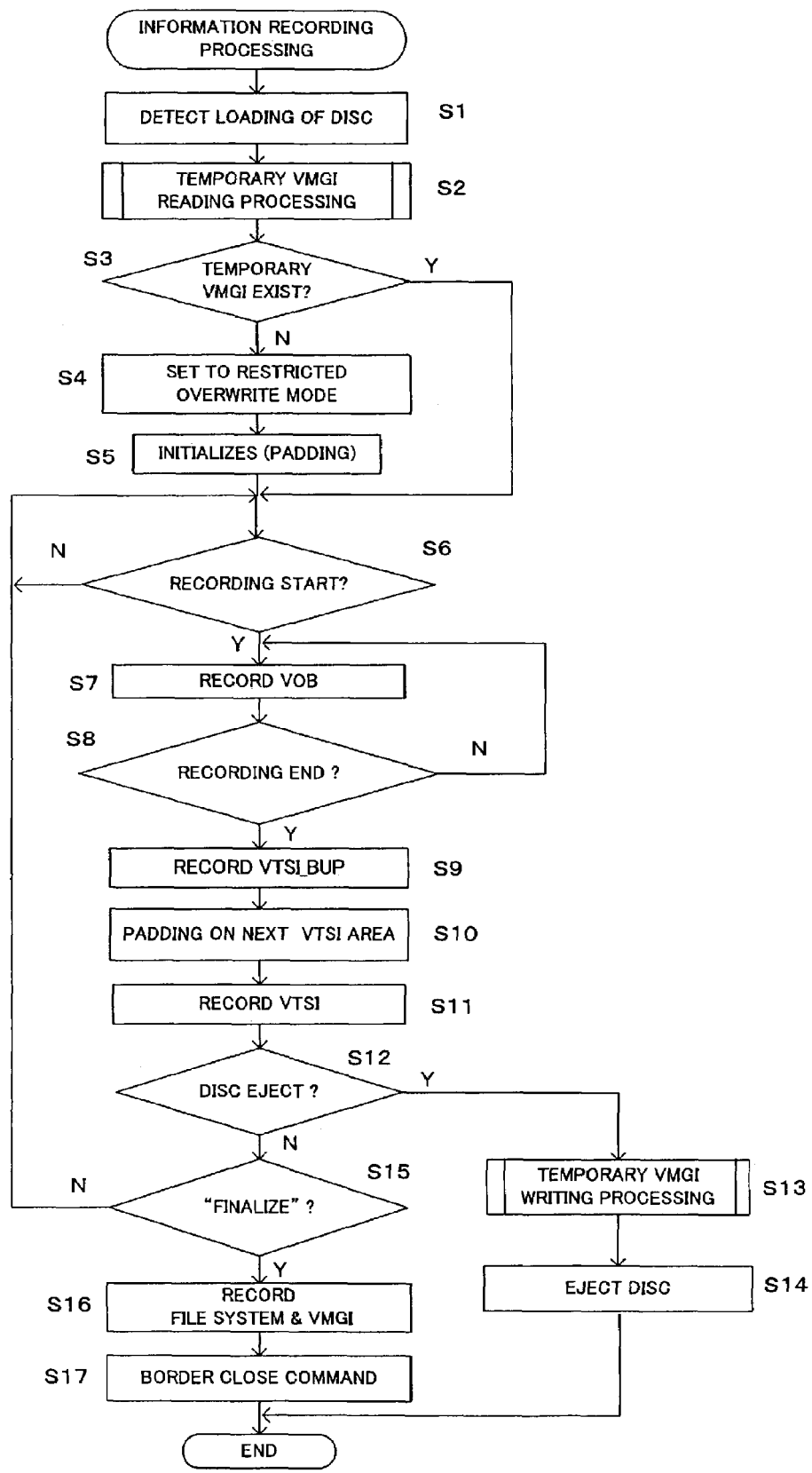
FIG. 9 is a main routine of an information recording process according to the present invention.
Figure 10:
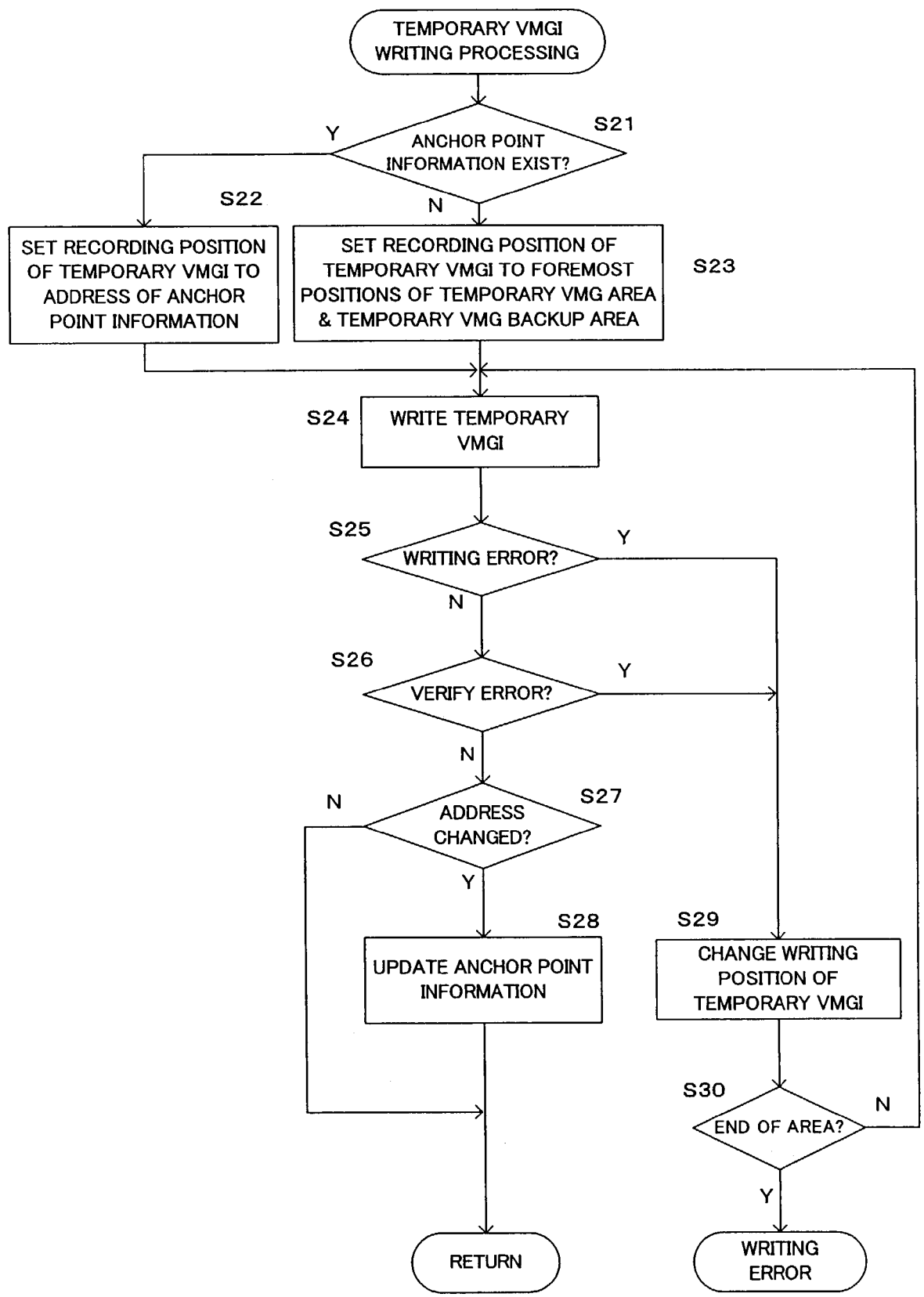
FIG. 10 is a sub-routine of the temporary VMGI writing process shown in FIG. 9.
Figure 11:
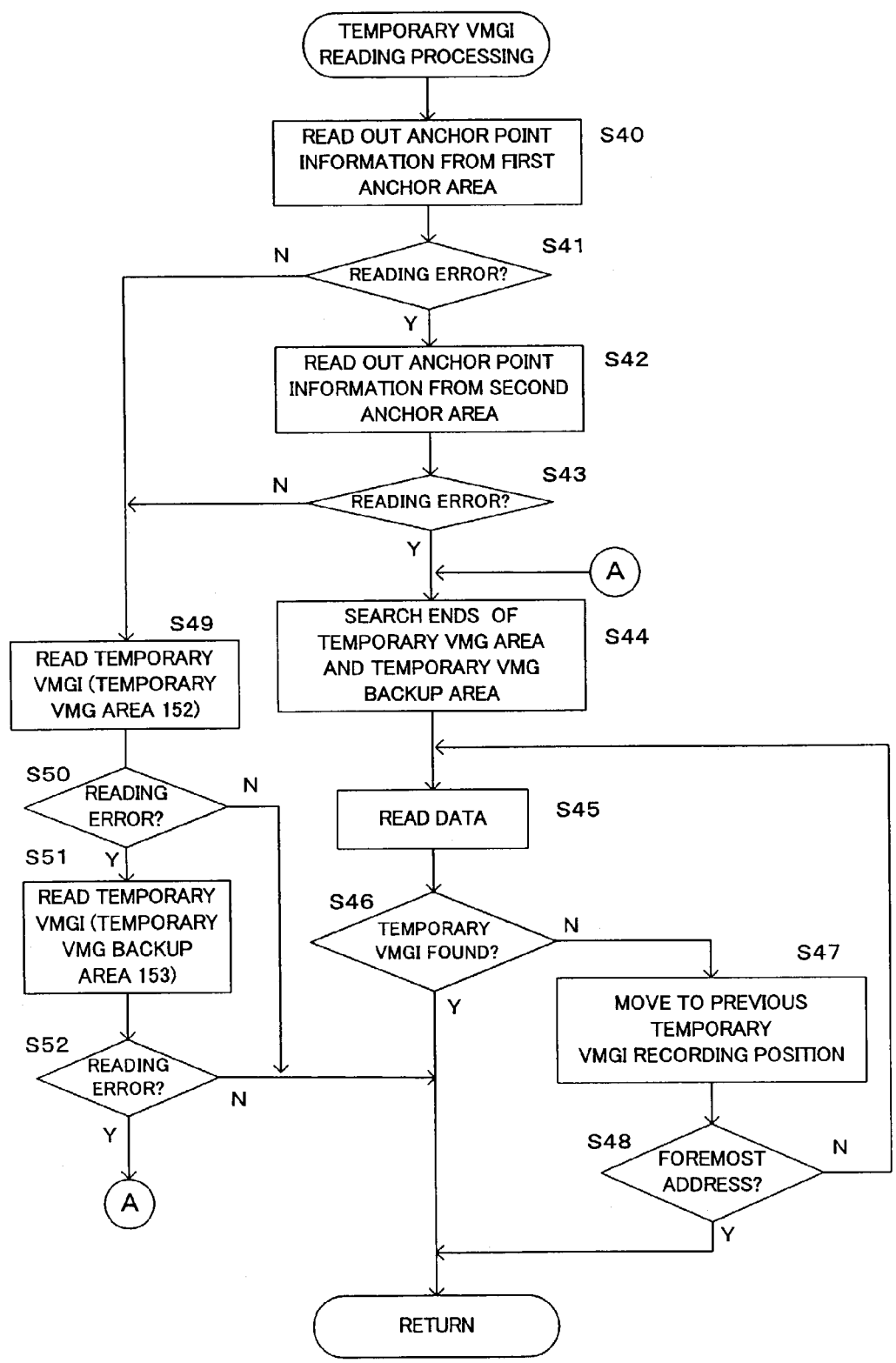
FIG. 11 is another sub-routine of the temporary VMGI reading process shown in FIG. 9.

Next, the information recording method of the present invention including the recording of the temporary VMGI will be described with reference to FIGS. 9 to 11. FIG. 9 illustrates a main routine of the information recording processing according to the present invention, FIG. 10 illustrates the temporary VMGI writing processing illustrated in FIG. 9, and FIG. 11 illustrates the temporary VMGI reading processing illustrated in FIG. 9. It is to be noted that the processing described below are executed by the system controller 125 illustrated in FIG. 8 which executes a program for the information recording processing prepared beforehand and thereby controls the respective constituent elements of the information recording and reproducing apparatus S.

Referring to FIG. 9, first, when the system controller 125 detects that the disc is loaded onto the information recording and reproducing apparatus S (step S1), the system controller 125 then executes the temporary VMGI reading processing for reading the temporary VMGI recorded on the disc (step S2) In the temporary VMGI reading processing, in case that the temporary VMGI is recorded on the disc, the system controller 125 reads it out. When the temporary VMGI is not recorded on the disc, the system controller 125 outputs an error. The detail of the temporary VMGI reading process will be described later.

After the temporary VMGI reading processing, when the temporary VMGI is not recorded on the disc (step S3: No), the system controller 125 determines that the disc is a blank disc (unused disc), and sets that disc to the Restricted Overwrite mode by a format command (step S4). In the DVD-RW disc, information recording can be performed in a Disc-At-Once mode, an Incremental Write mode and a Restricted Overwrite mode, and information indicating one of the modes used for the disc is recorded on the disc. Accordingly, in step S4, the system controller 125 records, onto the disc, the information indicating that the disc is recorded in the Restricted Overwrite mode.

Then, the system controller 125 initializes the disc as illustrated in FIG. 6A (step S5). Namely, null data is recorded, by the padding, to the area from the file system information area FS up to the position of the initial VTSI in the data area DA, and then the processing proceeds to step S6.

On the other hand, when it is determined that the temporary VMGI is recorded on the disc (step S3; Yes), the processing proceeds directly to step S6.

In step S6, it is determined whether or not the user inputs a recording-starting instruction by operating the operation unit 133. Upon input of the recording-starting instruction by the user, the system controller 125 produces the VOBs from the recording information supplied from the external source, and records the VOBs on the disc as illustrated in FIG. 6B (step S7). Then, the system controller 125 determines whether or not the user inputs a recording-ending instruction by operating the operation unit 133 (step S8). Until the recording-ending instruction is input, the processing in step S7 is continued, and the recording information from the external source is recorded on the disc as a plurality of VOBs.

On the other hand, when the recording-ending instruction is input (step S8: Yes), the system controller 125 records the VTSI_BUP after the VOBs recorded by that time (step S9), as illustrated in FIG. 6B. The system controller 125 then records null data, by the padding, on the next VTSI area (step S10), and then records the VTSI on the inner-peripheral side of the VOBs as illustrated in FIG. 6C (step S11). In that way, the recording information supplied from the external source is recorded on the disc as one title.

The system controller 125 detects whether or not a disc-ejecting instruction is input by the user (step S12). When the disc-ejecting instruction is input, the system controller 125 executes the temporary VMGI writing processing (step S13)

As to the production of the temporary VMGI, the temporary VMGI is produced and is stored in the memory 127 every time the title is recorded on the disc according to the processing in the above-described steps S7 to S11. The temporary VMGI writing processing obtains the temporary VMGI for all the titles already recorded on the disc at that point of time from the memory 127 and records it on the disc, the detail of which will be described later. Then, upon completion of the temporary VMGI writing processing, the system controller 125 ejects the disc (step S14) and thereby the processing is ended.

When the disc-ejecting instruction is not detected (step S12: No), the system controller 125 detects whether or not the user inputs a "finalize" instruction of the disc by operating the operation unit 133 or else (step S15). When the finalize instruction is not detected, the processing returns to step S6, wherein the system controller 125 waits for the recording-starting instruction.

On the other hand, when the finalize instruction made by the user is detected (step S15: Yes), the system controller 125 executes the "finalize" processing of the disc. Namely, the system controller 125 produces the file system information and VMGI based on the information of all the titles already recorded on the disc at that point of time, and records them in the file system-area 151 and VMG area 154, respectively, illustrated in FIG. 5 (step S16). Further, the system controller 125 forms the lead-in area and the lead-out area by a Border-Close command (step S17), and then terminates the information recording processing. The "finalized" disc is in conformity with the previously-mentioned DVD-video standard and can be reproduced even by the DVD player for reproduction only.

Next, with reference to FIG. 10, the temporary VMGI writing processing will be described. First, the system controller 125 determines whether or not the anchor point information is already recorded in the anchor areas 160 and 161 in the file system area 151 of the disc subject to the recording (step S21). Specifically, the system controller 125 detects whether or not the anchor point information is recorded in the predetermined first anchor area 160 and the second anchor area 161. When the anchor point information is recorded, the system controller 125 sets the recording position of the temporary VMGI to the address positions indicated by the anchor point information (step S22). On the other hand, when the anchor point information is not recorded (step S21; No), the system controller 125 sets the recording positions of the temporary VMGI to the foremost 300h-th address of the temporary VMG area 152 and the foremost 500h-th address of the temporary VMG backup area 153 (step S23).

The system controller 125 writes the temporary VMGI into the recording positions set in steps S22 and S23 (step S24). Then, the system controller 125 determines whether or not a writing error occurred (step S25). If no writing error occurred, the system controller 125 further determines whether or not the "verify" processing is correctly performed (step S26). The "verify" processing is executed, for example, by reading out both of the temporary VMGI written in the temporary VMGI area 152 and the temporary VMGI written in the temporary VMG backup area 153 and collating them with each other. When they coincide with each other, the system controller 125 determines that the "verify" processing is correctly executed. When they do not coincide with each other, the system controller 125 determines that a verifying error occurred.

When the writing error is detected in step S25 or when the verify error is detected in step S26, as was previously described by referring to FIGS. 7A to 7E, the recording address of the temporary VMGI is changed. Namely, in the examples of FIGS. 7A to 7E, the recording addresses of the temporary VMGI in the temporary VMG area 152 and the temporary VMG backup area 153 are shifted by 20h (step S29). The system controller 125 then determines whether or not the address after shifting reaches the end of the temporary VMG area 152 or the temporary VMG backup area 153 (step S30). Namely, in the examples of FIGS. 7A to 7E, the system controller 152 determines whether or not the recording address of the temporary VMGI reached each of the 500h-th address that is the end of the temporary VMG area 152 and the 700h-th address that is the end of the temporary VMG backup area 153.

When the recording address of the temporary VMGI reached the end of each of the temporary VMG area 152 and the temporary VMG backup area 153 (step S30; Yes), this means that the temporary VMG area 152 and the temporary VMG backup area 153 in the disc are used up. Therefore, the system controller 125 determines that no more temporary VMGI can be written and executes the writing error processing. On the other hand, when the recording address of the temporary VMGI have not reach the end of the temporary VMG area 152 and the temporary VMG backup area 153 yet (step S30; No), the processing returns to step S24, in which the system controller 125 writes the temporary VMGI into the recording address updated in step S29. In this way, when the access error such as the writing error and the verify error occurred, the recording address is shifted and the temporary VMGI is written at the shifted recording address.

On the other hand, when it is determined in step S26 that the verify processing is correctly executed, the system controller 125 determines whether or not the recording address of the temporary VMGI was changed by the processing in step S29 (step S27). When the recording address of the temporary VMGI was changed, the system controller 125 writes the changed recording address into the first and second anchor areas 160 and 161 as the anchor point information (step S28), and then terminates the processing. On the other hand, when the recording address of the temporary VMGI was not changed, since there is no need to update the anchor point information, the processing ends.

Next, the temporary VMGI reading processing will be described with reference to a flow chart of FIG. 11. As illustrated in FIG. 9, the temporary VMGI reading processing is executed immediately after the disc is loaded. First, the system controller 125 reads the anchor point information from the first anchor area 160 (step S40) and determines whether or not a reading error occurred (step S41). When the reading error occurred, the system controller 125 reads the anchor point information from the second anchor area (step S42) and determines whether or not a reading error occurred (step S43). When the anchor point information is read out from both of the first anchor area 160 and the second anchor area 161, the system controller 125 reads out the temporary VMGI in the temporary VMG area 152 based on the anchor point information (step S49). When a reading error occurred (step S50; Yes), the system controller 125 further reads the temporary VMGI from the temporary VMG backup area 153 (step S51). When the temporary VMGI can be read out from any one of the temporary VMG area 152 and the temporary VMG backup area 153 (step S50 or S52; No), the processing returns to the main routine with determining the temporary VMGI thus obtained as the read result. On the other hand, when the temporary VMGI cannot be successfully read out from the temporary VMG area 152 or the temporary VMG backup area 153 (step S50 or S52; Yes), the processing proceeds to step S44.

Similarly, in a case where the anchor point information cannot be read from the first anchor area 160 and the second anchor area 161, the processing proceeds to step S44. In this case, since it is impossible to know the recording address of the temporary VMGI from the anchor point information, the controller 125 actually searches for the recording address of the temporary VMGI in the temporary VMG area 152 and the temporary VMG backup area 153. Namely, the system controller 125 first searches the end portion (the 4E0h-th address) of the temporary VMG area 152 and the end portion (the 6E0h-th address) of the temporary VMG backup area 153 (step S44), and reads the data recorded there (step S45). Since the temporary VMGI includes, at the foremost position thereof, the identification information indicating that the data is the temporary VMGI, the system controller 125 determines whether or not the identification information is included in the data read out from the address set in step S44. Thus, the system controller 125 can determine whether or not the data is the temporary VMGI (step S46).

When the temporary VMGI is found (step S46; Yes), the system controller 125 reads out the temporary VMGI, and returns to the main routine. On the other hand, if the temporary VMGI is not found (step S46; No), the system controller 125 decrements the reading position by 20h-th address (step S47), and then determines whether or not the reading position coincides with the foremost addresses (300h and 500h) of the temporary VMG area 152 and the temporary VMG backup area 153 (step S48). When they coincide with each other, the system controller 125 determines that the temporary VMGI is not recorded in any one of the temporary VMG area 152 and temporary VMG backup area 153, and then returns to the main routine with the result of a reading error. On the other hand, when the reading positions do not coincide with the foremost addresses (300h and 500h) of the temporary VMG area 152 and the temporary VMG backup area 153, the processing returns to step S45. The system controller reads the data from the reading position before the change (step S45), and determines whether or not the temporary VMGI is included (step S46). Thereafter, that processing is repeated. When the reading position reaches the foremost positions of the temporary VMG area 152 and the temporary VMG backup area 153 (step S48; Yes), the system controller 125 determines that the result is a reading error. When the temporary VMGI is found (step S46; Yes), the system controller 125 determines the temporary VMGI as the read result, and the processing returns to the main routine.

In the above-described temporary VMGI reading processing, when the anchor point information is recorded on the disc, the temporary VMGI is first read out from the position that the anchor point information indicates. When the anchor point information is not recorded or cannot be read out, the recorded data is read out from the ends of the temporary VMG area 152 and the temporary VMG backup area 153 toward the foremost positions thereof, thereby to search for the temporary VMGI. When the temporary VMGI is not found eventually even when the reading position is advanced to the head of the temporary VMG area 152 and the temporary VMG backup area 153, the system controller 125 determines the reading error. The reason why the temporary VMGI is searched for from the ends to the heads of the temporary VMG area 152 and the temporary VMG backup area 153 when the anchor point information is not found in the processing from step S44 to step S48 is as follows. Namely, as was described by referring to FIGS. 7A to 7E, the recording position of the temporary VMGI is changed to the outer-peripheral side of the disc if an access error occurs in recording the temporary VMGI, and hence the temporary VMGI that is recorded at the most outside positions (the outer-peripheral side of the disc) in the temporary VMG area 152 and the temporary VMG backup area 153 is the latest (i.e., effective) temporary VMGI.

In the above-described embodiment, there has been described an example wherein the information is recorded onto the DVD-RW in the Restricted Overwrite mode. However, the application of the present invention is not limited thereto. Even in a case that the DVD-RW disc is fully formatted by initialization, the present invention can be applied. In that case, since the whole area of the DVD-RW disc is recorded with null data by the padding, it is unnecessary to execute the padding processing (the processing in step S10 in the flow chart of FIG. 9) on the VTSI area for the next title, as illustrated in FIGS. 6A to 6D.

As described above, the temporary VMGI for the titles recorded on the disc at the time of ending the recording is produced and is recorded at predetermined two positions in the file system information area when repeatedly recording the information onto the DVD-RW disc. Therefore, it is possible to stably record the temporary VMGI and have it stably stored in the disc. Also, when an access error occurs at the recording position of the temporary VMGI due to the physical deterioration of the disc or for some other reason, the temporary VMGI is recorded with changing the recording position. Therefore, even when the recording area is physically deteriorated by repeatedly recording the temporary VMGI, it is possible to reliably record the temporary VMGI. Also, if the recording position of the temporary VMGI is changed like that, since the anchor point information indicating the recording position of the effective temporary VMGI is recorded on the disc, it is possible to easily obtain the effective temporary VMGI by referring to the anchor point information. Further, if the anchor point information cannot be read for some reason, it is possible to obtain the temporary VMGI by sequentially reading out data from the temporary VMGI area and the temporary VMGI backup area from the ends thereof.

According to the present invention, unit recording information that includes recording information including, for example, video and audio data and reproduction control information for reproducing that recording information is recorded on a rewritable-type recording medium. After the unit recording information is recorded, temporary management information for all the unit recording information already recorded on the recording medium is produced and is recorded on the recording medium. The temporary management information is the management information for the unit information recorded on the recording medium. Therefore, by producing the temporary management information and recording it on the recording medium every time new unit recording information is recorded on the recording medium, it becomes possible to reproduce the respective unit recording information from the recording medium by referring to the temporary management information. If an access error occurs at the time of recording the temporary management information, that position on the recording medium is not used any more, and the temporary management information is recorded on a changed position. Since the temporary management information is recorded each time new unit information is recorded onto the recording medium, it is possible that the recording medium is partially deteriorated due to the repeated recording at the same position on the recording medium and hence an access error may occur. In the present invention, since the temporary recording position of the temporary management information is changed, the temporary management information can be always correctly recorded and reproduced.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2002-156452 filed on May 29, 2002 including the specification, claims, drawings and summary is incorporated herein by reference in its entirety.

What is claimed is:

1. An information recording apparatus which records information on a rewritable-type recording medium in accordance with a predetermined recording format, comprising:
   a recording device which records unit recording information including recording information and reproduction control information for controlling reproduction of the recording information on the rewritable-type recording medium;
   a temporary management information producing device which produces temporary management information for temporarily managing all the unit recording information recorded on the rewritable-type recording medium; and
   a temporary management information recording device which records the temporary management information at a temporary recording position on the rewritable-type recording medium,
   wherein the temporary management information recording device changes the temporary recording position and records the temporary management information at the temporary recording position after change when an access error of the temporary management information occurs, and
   wherein the temporary management information recording device records the temporary management information as a block having a predetermined data amount, and
   wherein a space between a first block corresponding to the temporary recording position of the temporary management information after the change and a second block corresponding to the temporary recording position of the temporary management information before the change is one block.

2. The information recording apparatus according to claim 1, further comprising a temporary recording position information recording device which records temporary recording position information indicating the temporary recording position on the rewritable-type recording medium at a predetermined position on the rewritable-type recording medium.

3. The information recording apparatus according to claim 1, wherein the temporary management information recording device records same temporary management information at two different positions on the rewritable-type recording medium.

4. The information recording apparatus according to claim 1, wherein the rewritable-type recording medium has a first temporary management information recording area and a second temporary management information recording area, and records the same temporary management information at each of the first temporary management information recording area and the second temporary management information recording area.

5. The information recording apparatus according to claim 4, wherein the temporary management information recording device sets the temporary recording position after change to a position which is not adjacent to the temporary recording position before change in both the first and the second temporary management information recording areas.

6. The information recording apparatus according to claim 5, wherein the temporary management information recording device records the temporary management information as a block having a predetermined data amount, and sets the temporary recording position after change to a position spaced by one block from the temporary recording position before change.

7. The information recording apparatus according to claim 4, further comprising a temporary recording position information recording device which records temporary recording position information indicating the temporary recording positions in the first and the second temporary management information recording areas on a predetermined position on the rewritable-type recording medium.

8. The information recording apparatus according to claim 7, wherein the temporary recording position information recording device records same temporary recording position information at different predetermined positions on the rewritable-type recording medium.

9. The information recording apparatus according to claim 1, wherein the predetermined recording format is in conformity with a DVD-video standard, the rewritable-type recording medium comprises a DVD--RW, the unit recording information is a VTS (Video Title Set) according to the recording format, and the temporary management information is TMR_VMGI (Video Manager Information) according to the recording format.

10. The information recording apparatus according to claim 9, wherein the temporary recording position is located between a file system information area and a data recording area according to the recording format.

11. An information recording and reproducing apparatus which records information on a rewritable-type recording medium in accordance with a predetermined recording format and reproduces the information recorded thereon, the apparatus comprising:
a recording device which records unit recording information including recording information and reproduction control information for controlling reproduction of the recording information on the rewritable-type recording medium;
a temporary management information producing device which produces temporary management information for temporarily managing all the unit recording information recorded on the rewritable-type recording medium;
a temporary management information recording device which records the temporary management information at a temporary recording position in a temporary recording area defined on the rewritable-type recording medium, wherein the temporary management information recording device changes the temporary recording position and records the temporary management information at the temporary recording position after change when an access error of the temporary management information occurs;
a temporary recording position information recording device which records temporary recording position information indicating the temporary recording position on the rewritable-type recording medium on a predetermined position on the rewritable-type recording medium; and
a reproducing device which obtains the temporary recording position information and then obtains the temporary management information based on the temporary recording position information to reproduce the unit recording information,
wherein the temporary management information recording device records the temporary management information as a block having a predetermined data amount, and
wherein a space between a first block corresponding to the temporary recording position of the temporary management information after the change and a second block corresponding to the temporary recording position of the temporary management information before the change is one block.

12. The information recording and reproducing apparatus according to claim 11, wherein the reproducing device obtains the temporary management information by sequentially reading the recording information in the temporary recording area when the temporary recording position information cannot be obtained from the rewritable-type recording medium.

13. An information recording method which records information on a rewritable-type recording medium in accordance with a predetermined recording format, the method comprising:
a recording step which records unit recording information including recording information and reproduction control information for controlling reproduction of the recording information on the rewritable-type recording medium;
a temporary management information producing step which produces temporary management information for temporarily managing all the unit recording information recorded on the rewritable-type recording medium; and
a temporary management information recording step which records the temporary management information at a temporary recording position on the rewritable-type recording medium,
wherein the temporary management information recording step changes the temporary recording position and records the temporary management information at the temporary recording position after change when an access error of the temporary management information occurs, and
wherein the temporary management information recording step records the temporary management information as a block having a predetermined data amount, and
wherein a space between a first block corresponding to the temporary recording position of the temporary management information after the change and a second block corresponding to the temporary recording position of the temporary management information before the change is one block.

14. A computer program product, which is embodied in a computer readable medium and which carries a computer program executed by a computer included in an information recording apparatus which records information on a rewritable-type recording medium in accordance with a predetermined recording format, the program causing the computer to function as:
a recording device which records unit recording information including recording information and reproduction control information for controlling reproduction of the recording information on the rewritable-type recording medium;
a temporary management information producing device which produces temporary management information for temporarily managing all the unit recording information recorded on the rewritable-type recording medium; and a temporary management information recording device which records the temporary management information at a temporary recording position on the rewritable-type recording medium, wherein the temporary management information recording device changes the temporary recording position and records the temporary management information into the temporary recording position after change when an access error of the temporary management information occurs, and wherein the temporary management information recording device records the temporary management information as a block having a predetermined data amount, and wherein a space between a first block corresponding to the temporary recording position of the temporary management information after the change and a second block corresponding to the temporary recording position of the temporary management information before the change is one block.

15. A computer readable medium that stores a program executed by a computer included in an information recording apparatus for recording information on a rewritable-type recording medium in accordance with a predetermined recording format, the program causing the computer to function as:

a recording device which records unit recording information including recording information and reproduction control information for controlling reproduction of the recording information on the rewritable-type recording medium;

a temporary management information producing device which produces temporary management information for temporarily managing all the unit recording information recorded on the rewritable-type recording medium; and a temporary management information recording device which records the temporary management information at a temporary recording position on the rewritable-type recording medium, wherein the temporary management information recording device changes the temporary recording position and records the temporary management information into the temporary recording position after change when an access error of the temporary management information occurs, and wherein the temporary management information recording device records the temporary management information as a block having a predetermined data amount, and wherein a space between a first block corresponding to the temporary recording position of the temporary management information after the change and a second block corresponding to the temporary recording position of the temporary management information before the change is one block.

* * * * *